United States Patent
Foti

(10) Patent No.: US 12,225,060 B2
(45) Date of Patent: Feb. 11, 2025

(54) ENHANCED P-CSCF RESTORATION PROCEDURE

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 62 days.

(21) Appl. No.: 16/972,731

(22) PCT Filed: Jun. 21, 2019

(86) PCT No.: PCT/IB2019/055264
§ 371 (c)(1),
(2) Date: Dec. 7, 2020

(87) PCT Pub. No.: WO2020/008292
PCT Pub. Date: Jan. 9, 2020

(65) Prior Publication Data
US 2021/0266349 A1    Aug. 26, 2021

Related U.S. Application Data

(60) Provisional application No. 62/714,394, filed on Aug. 3, 2018, provisional application No. 62/693,002, filed on Jul. 2, 2018.

(51) Int. Cl.
*H04L 65/1045*    (2022.01)
*H04L 65/1016*    (2022.01)
(Continued)

(52) U.S. Cl.
CPC ...... *H04L 65/1045* (2022.05); *H04L 65/1016* (2013.01); *H04L 65/1069* (2013.01);
(Continued)

(58) Field of Classification Search
CPC ............. H04L 65/1006; H04L 65/1016; H04L 65/105; H04L 65/1069; H04L 65/1073; H04W 68/005
See application file for complete search history.

(56) References Cited

U.S. PATENT DOCUMENTS

2011/0128843 A1    6/2011    Hubert et al.
2012/0042084 A1*   2/2012    Dutta .................. H04L 65/1069
                                                    709/228
(Continued)

FOREIGN PATENT DOCUMENTS

CN    101217407 A    7/2008
CN    101489242 A    7/2009
(Continued)

OTHER PUBLICATIONS

International Search Report and Written Opinion dated Oct. 23, 2019 issued in PCT Application No. PCT/IB2019/055264, consisting of 13 pages.
(Continued)

*Primary Examiner* — Khaled M Kassim
(74) *Attorney, Agent, or Firm* — Sage Patent Group

(57) ABSTRACT

Apparatuses and methods are disclosed for P-CSCF restoration. In one embodiment, a method includes receiving a P-CSCF restoration message, the P-CSCF restoration message including an indication of a failed P-CSCF server; as a result of the received P-CSCF restoration message, identifying at least one Session Management Function, SMF, server associated with the failed P-CSCF server; and communicating, to the identified at least one SMF server, a restoration message for tearing down at least one session for at least one user equipment, UE, associated with the failed P-CSCF server. In another embodiment, a method includes as a result of a received restoration message, at least one of: tearing down at least one session for at least one user
(Continued)

equipment, UE, associated with the failed P-CSCF server; and notifying the at least one UE of the failed P-CSCF server.

10 Claims, 12 Drawing Sheets

(51) Int. Cl.
  *H04L 65/1069* (2022.01)
  *H04L 65/1073* (2022.01)
  *H04L 65/1104* (2022.01)
  *H04W 68/00* (2009.01)
(52) U.S. Cl.
  CPC ...... *H04L 65/1073* (2013.01); *H04L 65/1104* (2022.05); *H04W 68/005* (2013.01)

(56) References Cited

U.S. PATENT DOCUMENTS

| | | | |
|---|---|---|---|
| 2015/0195864 A1 | 7/2015 | Rodrigo et al. | |
| 2016/0380802 A1 | 12/2016 | Kunz et al. | |
| 2018/0132291 A1* | 5/2018 | Kalepu | H04W 76/18 |
| 2019/0261449 A1* | 8/2019 | Kim | H04W 64/003 |
| 2020/0178336 A1* | 6/2020 | Li | H04L 65/1045 |
| 2020/0344273 A1* | 10/2020 | Sinha | H04L 65/105 |

FOREIGN PATENT DOCUMENTS

| | | |
|---|---|---|
| CN | 102316435 A | 1/2012 |
| CN | 104284360 A | 1/2015 |
| CN | 105765933 A | 7/2016 |
| CN | 105765934 A | 7/2016 |
| CN | 107276811 A | 10/2017 |
| EP | 3092773 A1 | 11/2016 |
| WO | 2015104367 A1 | 7/2015 |

OTHER PUBLICATIONS

3GPP TS 23.380 V15.0.0 (Jun. 2018) 3rd Generation Partnership Project; Technical Specification Group Core Network and Terminals; IMS Restoration Procedures (Release 15), consisting of 54 pages.

First Chinese Office Action for Chinese Patent Application No. Cn 201980039777.X mailed Oct. 9, 2022, 18 pages (including English translation).

Huawei et al., "Solution for KI on Discovery of Network Functions", 3GPP TSG_SA\WG2 Meeting #126, S2-182175, Feb. 26-Mar. 2, 2018, Montreal, Canada, 3 pages.

* cited by examiner

ENHANCED P-CSCF RESTORATION PROCEDURE

CROSS-REFERENCE TO RELATED APPLICATIONS

This application is a Submission Under 35 U.S.C. § 371 for U.S. National Stage Patent Application of International Application No.: PCT/IB2019/055264, filed Jun. 21, 2019 entitled "ENHANCED P-CSCF RESTORATION PROCEDURE," which claims priority to U.S. Provisional Application No. 62/693,002, filed Jul. 2, 2018, entitled "ENHANCED P-CSCF RESTORATION PROCEDURE," and U.S. Provisional Application No. 62/714,394, filed Aug. 3, 2018 entitled "ENHANCED P-CSCF RESTORATION PROCEDURE", the entireties of all of which are incorporated herein by reference.

TECHNICAL FIELD

Wireless communication and in particular, to methods and apparatuses for Proxy-Call Session Control Function (P-CSCF) restoration.

BACKGROUND

The IP Multimedia Subsystem (hereinafter IMS) enables operators of a Public Land Mobile Network (hereinafter PLMN) to provide its subscribers with multimedia services based and built on Internet applications, services and protocols. Different services and applications can be offered on top of an IMS.

Internet Protocol (IP) connectivity of a user equipment (UE) terminal to the IMS can be through an access network, also referred to as an IP-Connectivity Access Network (IP-CAN), such as, for example, 3rd Generation Partnership Project (3GPP) 4G, 5G, New Radio (NR), etc. networks. Before being authorized to make use of IMS services provided by IMS applications, the user has to register into the IMS. The P-CSCF provides proxy communications between the UE and the IMS, via the access network.

When a P-CSCF fails, the P-CSCF restoration for some access networks (e.g., 4G and 5G) is a passive procedure, such as, for example, where detection of a failed P-CSCF may occur only if there is a terminating session to a UE. This can enable the IMS network to detect that the P-CSCF is not responding, and to force the UE to register in IMS again using a different P-CSCF by clearing the IMS Packet Data Network (PDN) connection. Clearing the IMS PDN connection forces the UE to establish a new PDN connection with the IMS Access Point Name (APN), and to re-register in IMS.

One issue with passive P-CSCF restoration procedures is that the terminating session is lost and the same fate may occur to all UEs registered via that P-CSCF, particularly if the UEs receive terminating sessions before their re-registration is refreshed. Another potential issue with passive P-CSCF restoration is that the IMS network is not able to benefit from the knowledge that a P-CSCF is down. This can result in revenue lost for all sessions that could not be established.

SUMMARY

Some embodiments advantageously provide methods and apparatuses for P-CSCF restoration that may advantageously provide a proactive P-CSCF restoration procedure that can allow the IMS network to benefit from the knowledge that a P-CSCF is down, not just for the UE whose session is terminated due to a failed P-CSCF, but for all UEs registered via such P-CSCF.

According to a first aspect of the present disclosure, a method for a user equipment, UE, for participating in an Internet Protocol, IP, Multimedia Subsystem, IMS, session using a first Proxy-Call Session Control Function, P-CSCF, is provided. The method includes receiving a notification to tear down the IMS session with the first P-CSCF. The method includes, as a result of the received notification, tearing down the IMS session and establishing a new IMS session with a second P-CSCF, different from the first P-CSCF.

In some embodiments of the first aspect, the receiving the notification to tear down the IMS session with the first P-CSCF is a result of a detected failure in the first P-CSCF. In some embodiments of the first aspect, the receiving the notification to tear down the IMS session with the first P-CSCF is based on another UE terminating an IMS session with the first P-CSCF, the another UE (14) being different from the UE.

According to a second aspect of the present disclosure, a method for Proxy-Call Session Control Function, P-CSCF, restoration is provided. The method includes receiving a P-CSCF restoration message, the P-CSCF restoration message including an indication of a failed P-CSCF server. The method includes, as a result of the received P-CSCF restoration message, identifying at least one Session Management Function, SMF, server associated with the failed P-CSCF server. The method includes communicating, to the identified at least one SMF server, a restoration message for tearing down at least one session for at least one user equipment, UE, associated with the failed P-CSCF server.

In some embodiments of the second aspect, the indication of the failed P-CSCF server includes at least an address of the P-CSCF server. In some embodiments of the second aspect, the identifying the at least one SMF server includes identifying each SMF associated with the failed P-CSCF server; and the communicating the restoration message includes communicating a restoration message to each SMF associated with the failed P-CSCF server to tear down each session for each UE associated with the failed P-CSCF server. In some embodiments of the second aspect, the communication of the restoration message for tearing down the at least one session for the at least one UE associated with the failed P-CSCF server forces the at least one UE to re-register in Internet Protocol Multimedia Subsystem, IMS, with a second P-CSCF server, the second P-CSCF server being different from the failed P-CSCF server. In some embodiments of the second aspect, the method further includes locating each SMF that includes an indication of the P-CSCF server in a Protocol Data Unit, PDU, session response.

According to a third aspect of the present disclosure, a method for Proxy-Call Session Control Function, P-CSCF, restoration is provided. The method includes receiving a restoration message, the restoration message including an indication of a failed P-CSCF server. The method includes, as a result of the received restoration message, at least one of: tearing down at least one session for at least one user equipment, UE, associated with the failed P-CSCF server; and notifying the at least one UE of the failed P-CSCF server.

In some embodiments of the third aspect, the method further includes communicating an address of a second P-CSCF server for re-registration of the at least one UE, the second P-CSCF server being different from the failed P-CSCF server. In some embodiments of the third aspect, the tearing down of the at least one session for the at least one UE associated with the failed P-CSCF server includes tearing down each session for each UE associated with the failed P-CSCF server. In some embodiments of the third aspect, the method further includes as a result of the received restoration message, locating each UE participating in a Protocol Data Unit, PDU, session using the failed P-CSCF server.

According to a fourth aspect of the present disclosure, a method for a Serving-Call Session Control Function, S-CSCF, server for Proxy-Call Session Control Function, P-CSCF, restoration is provided. The method includes communicating a status subscribe request to a Network Function, NF, Repository Function, NRF, server for status of a P-CSCF server. The method includes as a result of the status subscribe request, receiving, from the NRF server, a notification of a failure of the P-CSCF server associated with a user equipment, UE.

In some embodiments of the fourth aspect, the method further includes as a result of at least the received notification, communicating an indication of the failure of the P-CSCF server associated with the UE to a Home Subscriber Server, HSS, server.

According to a fifth aspect of the present disclosure, a user equipment, UE, for participating in an Internet Protocol, IP, Multimedia Subsystem, IMS, session using a first Proxy-Call Session Control Function, P-CSCF, is provided. The UE includes processing circuitry configured to cause the UE to receive a notification to tear down the IMS session with the first P-CSCF; and as a result of the received notification, tear down the IMS session and establish a new IMS session with a second P-CSCF, different from the first P-CSCF.

In some embodiments of the fifth aspect, the processing circuitry is further configured to receive the notification to tear down the IMS session with the first P-CSCF as a result of a detected failure in the first P-CSCF. In some embodiments of the fifth aspect, the processing circuitry is further configured to receive the notification to tear down the IMS session with the first P-CSCF based on another UE terminating an IMS session with the first P-CSCF, the another UE being different from the UE.

According to a sixth aspect of the present disclosure, a policy server for Proxy-Call Session Control Function, P-CSCF, restoration is provided. The policy server includes processing circuitry configured to cause the policy server to: receive a P-CSCF restoration message, the P-CSCF restoration message including an indication of a failed P-CSCF server; as a result of the received P-CSCF restoration message, identify at least one Session Management Function, SMF, server associated with the failed P-CSCF server; and communicate, to the identified at least one SMF server, a restoration message for tearing down at least one session for at least one user equipment, UE, associated with the failed P-CSCF server.

In some embodiments of the sixth aspect, the indication of the failed P-CSCF server includes at least an address of the P-CSCF server. In some embodiments of the sixth aspect, the processing circuitry is further configured to cause the policy server to: identify the at least one SMF server by being configured to cause the policy server to identify each SMF associated with the failed P-CSCF server; and communicate the restoration message by being configured to cause the policy server to communicate a restoration message to each SMF associated with the failed P-CSCF server to tear down each session for each UE associated with the failed P-CSCF server. In some embodiments of the sixth aspect, the processing circuitry is further configured to cause the policy server to communicate the restoration message to force the at least one UE to re-register in Internet Protocol Multimedia Subsystem, IMS, with a second P-CSCF server, the second P-CSCF server being different from the failed P-CSCF server. In some embodiments of the sixth aspect, the processing circuitry is further configured to cause the policy server to locate each SMF that includes an indication of the P-CSCF server in a Protocol Data Unit, PDU, session response.

According to a seventh aspect of the present disclosure, a Session Management Function, SMF, server for Proxy-Call Session Control Function, P-CSCF, restoration is provided. The SMF server includes processing circuitry configured to cause the SMF server to receive a restoration message, the restoration message including an indication of a failed P-CSCF server; and as a result of the received restoration message, at least one of: tear down at least one session for at least one user equipment, UE, associated with the failed P-CSCF server; and notify the at least one UE of the failed P-CSCF server.

In some embodiments of the seventh aspect, the processing circuitry is further configured to cause the SMF server to communicate an address of a second P-CSCF server for re-registration of the at least one UE, the second P-CSCF server being different from the failed P-CSCF server. In some embodiments of the seventh aspect, the processing circuitry is further configured to cause the SMF server to tear down the at least one session for the at least one UE associated with the failed P-CSCF server by being configured to cause the SMF server to: tear down each session for each UE associated with the failed P-CSCF server. In some embodiments of the seventh aspect, the processing circuitry is further configured to cause the SMF server to: as a result of the received restoration message, locate each UE participating in a Protocol Data Unit, PDU, session using the failed P-CSCF server.

According to an eighth aspect of the present disclosure, a Serving-Call Session Control Function, S-CSCF, server for Proxy-Call Session Control Function, P-CSCF, restoration is provided. The S-CSCF server includes processing circuitry configured to cause the S-CSCF server to communicate a status subscribe request to a Network Function, NF, Repository Function, NRF, server for status of a P-CSCF server; and as a result of the status subscribe request, receive, from the NRF server, a notification of a failure of the P-CSCF server associated with a user equipment, UE.

In some embodiments of the eighth aspect, the processing circuitry is further configured to cause the S-CSCF server to as a result of at least the received notification, communicate an indication of the failure of the P-CSCF server associated with the UE to a Home Subscriber Server, HSS, server.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
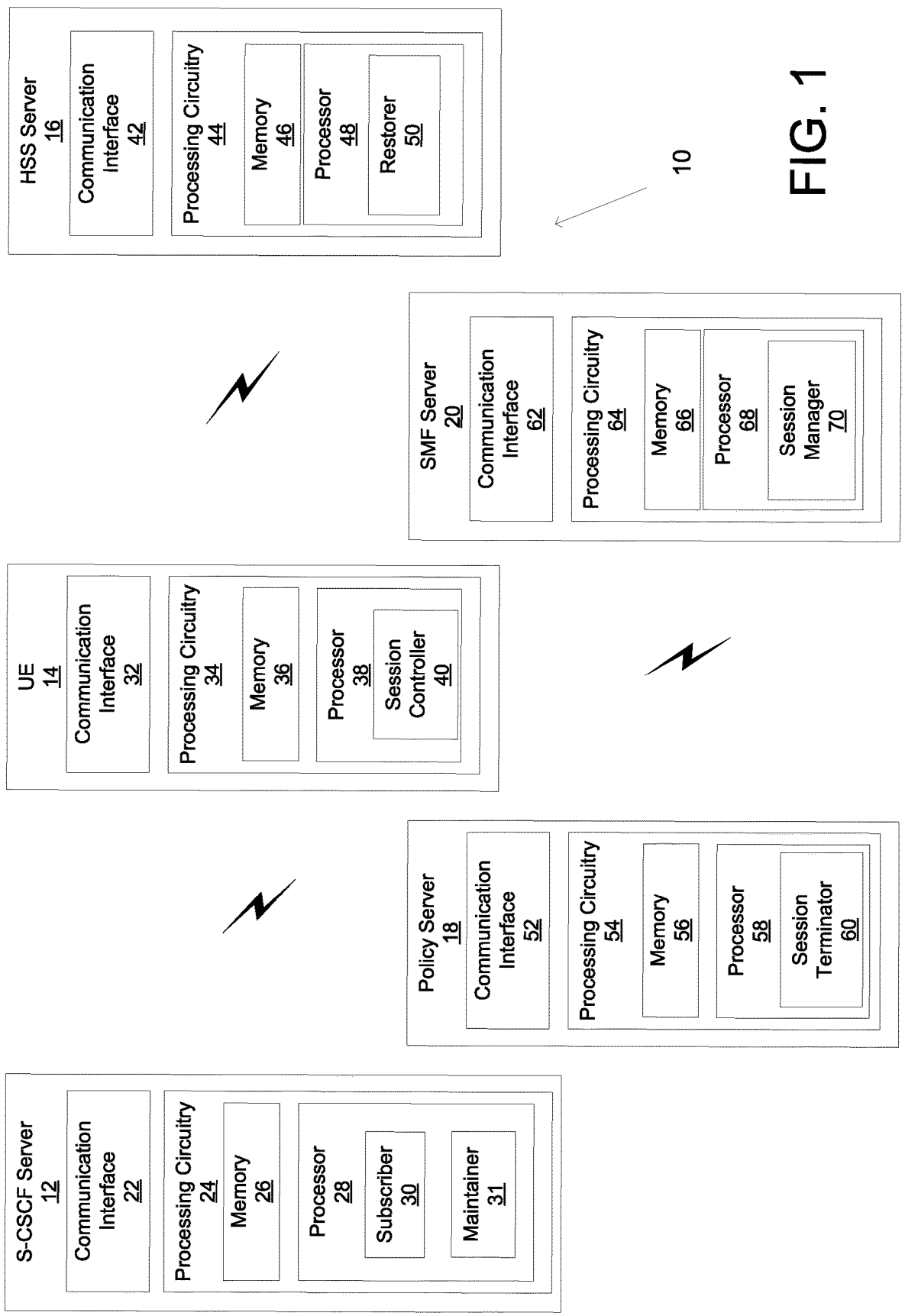
FIG. 1 is a system for P-CSCF restoration in accordance with the principles of the disclosure.

In some embodiments, a proactive solution that remedies at least some of the above short comings is provided. For example, in some embodiments, one or more of the following may be provided:

Every P-CSCF in a live system may register itself with the Network Function (NF) Repository Function (NRF);

Every Serving-Call Session Control Function (S-CSCF) may store, per P-CSCF it is associated with, a list of IMPU/IMPU pairs, and their contacts that are registered with the P-CSCF;

Every S-CSCF may subscribe with the NRF to the status of every P-CSCF it handles, or is otherwise associated with;

When a S-CSCF is notified from the NRF of a failed P-CSCF, the S-CSCF contacts the HSS for every IP Multimedia Private Identity/IP Multimedia Public Identity (IMPI/IMPU) pair in that list for the failed P-CSCF; and/or Subsequently, there may be at least three embodiments or options for P-CSCF restoration, which may be performed for every UE using the P-CSCF that failed.

In one exemplary option, the HSS sends a message to the Session Management Function (SMF) associated with the IMPI/IMPU pair to indicate P-CSCF failure and restoration. SMF may in turn clear the session forcing the UE to create a new IMS session.

In a second exemplary option, the HSS sends to Access and Mobility Function (AMF) (instead of SMF) the same information as in the first option, which may cause the AMF to clear the IMS session for the UE. The UE may be notified to start a new IMS session with a different P-CSCF.

In a third option, the HSS sends a message to the AMF associated with the IMPI/IMPU pair to indicate P-CSCF failure and restoration (as with the second option), and the AMF notifies the UE to tear down the IMS session (instead of the AMF clearing the IMS session for the UE, as in the second option). Thus, in the third option, the UE is notified and then the UE is responsible for tearing down the IMS session and establishing a new IMS session with a different P-CSCF.

In some embodiments, one or more of the following may be provided:

Every P-CSCF in a live system may register itself with the Network Function (NF) Repository Function (NRF);

Every S-CSCF may subscribe with the NRF to the status of every P-CSCF it handles, or is otherwise associated with;

When a S-CSCF is notified from the NRF of a failed P-CSCF, the S-CSCF contacts the HSS; and the HSS sends a request to a policy server, such as, for example, the Policy and Charging Rules Function/Policy Control Function (PCRF/PCF) server associated with the UE to invoke P-CSCF restoration. The PCRF/PCF then locates all SMFs that have used the P-CSCF address of the failed P-CSCF. Such information may be configured/available in the PCRF/PCF. For each SMF in that list, the PCRF/PCF may invoke P-CSCF restoration. The SMF may then locate all UEs that are using the failed P-CSCF and tears down the session forcing the UE to reestablish a new PDU session. The SMF returns the address of the new P-CSCF to be used for that purpose.

Accordingly, some embodiments of the present disclosure provide for a proactive procedure for P-CSCF restoration. The disclosure provides examples of embodiments for P-CSCF restoration that may advantageously provide a proactive P-CSCF restoration procedure under which the IMS network may benefit from the knowledge that a P-CSCF is down. Such is the case not just for a particular UE whose session is terminated due to a failed P-CSCF, but rather for all UEs registered via the failed P-CSCF.

Before describing in detail exemplary embodiments, it is noted that the embodiments reside primarily in combinations of apparatus components and processing steps related to P-CSCF restoration. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terms "node" and/or "entity" used herein can be any kind of network node or entity comprised in a network, such as, for example, a node such as an S-CSCF server, SMF server, NRF server, HSS server, etc. As used herein, the term server is intended in a broad sense and may encompass any computing device that provides a function and/or service to support IMS, such as an S-CSCF, SMR, NRF, policy control and/or HSS function and/or service. The term HSS is not limited to the HSS specified in 4G systems in 3GPP. The HSS described herein may encompass any entity holding subscriber profile information and performing subscriber authorization interacting with IMS. Other entities that the HSS may refer include but are not limited to the 5G UDM (User Data management) specified in 5G system in 3GPP.

In some embodiments, the node can by any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The UE herein can be any type of device capable of communicating with a network node or another UE over radio signals, such as wireless device (WD), and/or over a wired connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc. The UE herein can by any type of communication device capable of communicating with a cloud service provider and/or a network node and/or a server, such as, for example, personal computer (PC), a Tablet, a mobile terminal, via a wired connection and/or a wireless connection. The UE can, in some embodiments, be considered a client terminal, usable by a user to access an IMS using a P-CSCF, register with the IMS using the P-CSCF, and participate in restoration of a failed P-CSCF, according to one or more of the techniques described herein.

Also, in some embodiments the generic term "radio network node" may be used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

In some embodiments, the terms "S-CSCF server" and "S-CSCF" may be used interchangeably. In some embodiments, the S-CSCF server may be a node and/or computing device operating as a Session Initiation Protocol (SIP) server and/or a registrar in, for example, an IMS network. In some embodiments, the S-CSCF may be considered a central node of the signalling plane and may perform other support functions related to SIP communications between, for example, UEs.

In some embodiments, the term policy server may be intended to indicate a policy node configured to determine policy rules in a multimedia network. In some embodiments, the policy server may be a PCRF server related to 3GPP architecture and may be configured to determine policy rules for traffic flow in real-time in a multimedia network. In some embodiments, the policy server may be a PCF server for use within a 3GPP architecture and may also be configured to provide policy rules based on subscription information.

In some embodiments, the Session Management Function (SMF) may be considered a session manager that provides functionality related to subscriber sessions, such as, for example, session establishment, modification, and release. In some embodiments, the SMF is the SMF specified in 3GPP 5G architecture. In other embodiments, the SMF may be another type of session manager configured to support subscriber sessions.

In some embodiments, one or more of the functions described herein, such as, for example, the SMF, PCRF/PCF, S-CSCF, P-CSCF, etc., may be implemented on the same machine or server, or may, in other embodiments, be implemented on separate machines or servers.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE, SMF, policy server, HSS or a S—CSCF may be distributed over a plurality of UEs, a plurality of SMFs, a plurality of policy servers, a plurality of HSSs and/or a plurality of S-CSCFs. In other words, it is contemplated that the functions of the S-CSCF, SMF, HSS, policy server and UE described herein are not limited to performance by a single physical device and, in fact, can be distributed among several physical devices.

Any two or more embodiments described herein can be combined in any manner.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawings, in which like reference designators refer to like elements, there is shown in FIG. 1, an exemplary system, and its related components, constructed in accordance with the principles of the present disclosure and designated generally as "10." Referring to FIG. 1, system 10 may include a server such as an S-CSCF server 12, at least one UE 14, an HSS server 16, a policy server 18, and an SMF server 20, in communication with each other via one or more communication networks, paths and/or links, such as, one or more access networks and an IMS network. Although, FIG. 1 depicts a single S-CSCF 12 and a single UE 14, it should be understood that the system 10 may include any number of S-CSCFs 12 and any number of UEs 14, in addition to other elements that are not depicted. In some embodiments, the S-CSCF server 12 may be considered a main session control node in IMS and may, in some aspects, be considered a SIP server and registrar. Further, although, FIG. 1 depicts a single HSS server 16, a single policy server 18, and a single SMF server 20, it should be understood that the system 10 may include any number of HSS servers 16, any number of policy servers 18, and any number of SMF servers 20, in addition to other elements that are not depicted.

In one embodiment, S-CSCF server 12 includes a communication interface 22, processing circuitry 24, and memory 26. The communication interface 22 may be configured to communicate with the UE 14, directly or indirectly, and/or other elements in the system 10 to facilitate P-CSCF restoration according to the principles disclosed herein. In some embodiments, the communication interface 22 may be formed as or may include, for example, one or more radio frequency (RF) transmitters, one or more RF receivers, and/or one or more RF transceivers, and/or may be considered a radio interface. In some embodiments, the communication interface 22 may also include a wired interface.

The processing circuitry 24 may include one or more processors 28 and memory, such as, the memory 26. In particular, in addition to a traditional processor and memory, the processing circuitry 24 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 28 may be configured to access (e.g., write to and/or read from) the memory 26, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the S-CSCF server 12 may further include software stored internally in, for example, memory 26, or stored in external memory (e.g., database) accessible by the S-CSCF server 12 via an external connection. The software may be executable by the processing circuitry 24. The processing circuitry 24 may be configured to control any of the methods and/or processes described herein and/or to cause such methods, and/or processes to be performed, e.g., by the S-CSCF server 12. The memory 26 is configured to store data, programmatic software code and/or other information described herein. In some embodiments, the software may include instructions that, when executed by the processor 28 and/or Subscriber 30 and/or Maintainer 31, causes the processor 28 and/or Subscriber 30 and/or Maintainer 31 to perform the processes described herein with respect to the S-CSCF server 12, such as the processes described with respect to FIGS. 2 and 6.

In one embodiment, UE 14 includes a communication interface 32, processing circuitry 34, and memory 36. The communication interface 32 may be configured to communicate with the S-CSCF 12, directly or indirectly, and/or other elements in the system 10 to facilitate P-CSCF restoration according to the principles disclosed herein. In some embodiments, the communication interface 32 may be formed as or may include, for example, one or more radio frequency (RF) transmitters, one or more RF receivers, and/or one or more RF transceivers, and/or may be considered a radio interface. In some embodiments, the communication interface 32 may also include a wired interface.

The processing circuitry 34 may include one or more processors 38 and memory, such as, the memory 36. In particular, in addition to a traditional processor and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) configured to execute instructions. The processor 38 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 14 may further include software stored internally in, for example, memory 36, or stored in external memory (e.g., database) accessible by the UE 14 via an external connection. The software may be executable by the processing circuitry 34. The processing circuitry 34 may be configured to control any of the methods and/or processes described herein and/or to cause such methods, and/or processes to be performed, e.g., by the UE 14. The memory 36 is configured to store data, programmatic software code and/or other information described herein. In some embodiments, the software may include instructions that, when executed by the processor 38 and/or Session Controller 40, causes the processor 38 and/or Session Controller 40 to perform the processes described herein with respect to the UE 14, e.g., FIG. 7.

In one embodiment, HSS server 16 includes a communication interface 42, processing circuitry 44, and memory 46. The communication interface 42 may be configured to communicate with the S-CSCF 12, directly or indirectly, and/or other elements in the system 10 to facilitate P-CSCF restoration according to the principles disclosed herein. In some embodiments, the communication interface 42 may be formed as or may include, for example, one or more radio frequency (RF) transmitters, one or more RF receivers, and/or one or more RF transceivers, and/or may be considered a radio interface. In some embodiments, the communication interface 42 may also include a wired interface.

The processing circuitry 44 may include one or more processors 48 and memory, such as, the memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) configured to execute instructions. The processor 48 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the HSS server 16 may further include software stored internally in, for example, memory 46, or stored in external memory (e.g., database) accessible by the HSS server 16 via an external connection. The software may be executable by the processing circuitry 44. The processing circuitry 44 may be configured to control any of the methods and/or processes described herein and/or to cause such methods, and/or processes to be performed, e.g., by the HSS server 16. The memory 46 is configured to store data, programmatic software code and/or other information described herein. In some embodiments, the software may include instructions that, when executed by the processor 48 and/or Restorer 50, causes the processor 48 and/or Restorer 50 to perform the processes described herein with respect to the HSS server 16, such as the processes described with respect to FIG. 3.

In one embodiment, policy server 18 (e.g., Policy and Charging Rules Function (PCRF) and/or Policy Control Function (PCF) server) includes a communication interface 52, processing circuitry 54, and memory 56. The communication interface 52 may be configured to communicate with the S-CSCF 12, directly or indirectly, and/or other elements in the system 10 to facilitate P-CSCF restoration according to the principles disclosed herein. In some embodiments, the communication interface 52 may be formed as or may include, for example, one or more radio frequency (RF) transmitters, one or more RF receivers, and/or one or more RF transceivers, and/or may be considered a radio interface. In some embodiments, the communication interface 52 may also include a wired interface.

The processing circuitry 54 may include one or more processors 58 and memory, such as, the memory 56. In particular, in addition to a traditional processor and memory, the processing circuitry 54 may comprise integrated circuitry for processing and/or control, e.g., one or more processors and/or processor cores and/or FPGAs (Field Programmable Gate Array) and/or ASICs (Application Specific Integrated Circuitry) configured to execute instructions. The processor 58 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the policy server 18 may further include software stored internally in, for example, memory 56, or stored in external memory (e.g., database) accessible by the policy server 18 via an external connection. The software may be executable by the processing circuitry 54. The processing circuitry 54 may be configured to control any of the methods and/or processes described herein and/or to cause such methods, and/or processes to be performed, e.g., by the policy server 18. The memory 56 is configured to store data, programmatic software code and/or other information described herein. In some embodiments, the software may include instructions that, when executed by the processor 58 and/or Session Terminator 60, causes the processor 58 and/or Session Terminator 60 to perform the processes described herein with respect to the policy server 18, such as the processes described with respect to FIG. 4.

In one embodiment, SMF server 20 includes a communication interface 62, processing circuitry 64, and memory 66. The communication interface 62 may be configured to communicate with the S-CSCF 12, directly or indirectly, and/or other elements in the system 10 to facilitate P-CSCF restoration according to the principles disclosed herein. In some embodiments, the communication interface 62 may be formed as or may include, for example, one or more radio frequency (RF) transmitters, one or more RF receivers, and/or one or more RF transceivers, and/or may be considered a radio interface. In some embodiments, the communication interface 62 may also include a wired interface.

The processing circuitry 64 may include one or more processors 68 and memory, such as, the memory 66. In particular, in addition to a traditional processor and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) configured to execute instructions. The processor 68 may be configured to access (e.g., write to and/or read from) the memory 66, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the SMF server 20 may further include software stored internally in, for example, memory 66, or stored in external memory (e.g., database) accessible by the SMF server 20 via an external connection. The software may be executable by the processing circuitry 64. The processing circuitry 64 may be configured to control any of the methods and/or processes described herein and/or to cause such methods, and/or processes to be performed, e.g., by the SMF server 20. The memory 66 is configured to store data, programmatic software code and/or other information described herein. In some embodiments, the software may include instructions that, when executed by the processor 68 and/or Session Manager 70, causes the processor 68 and/or Session Manager 70 to perform the processes described herein with respect to the SMF server 20, such as the processes described with respect to FIG. 5.

Figure 2:
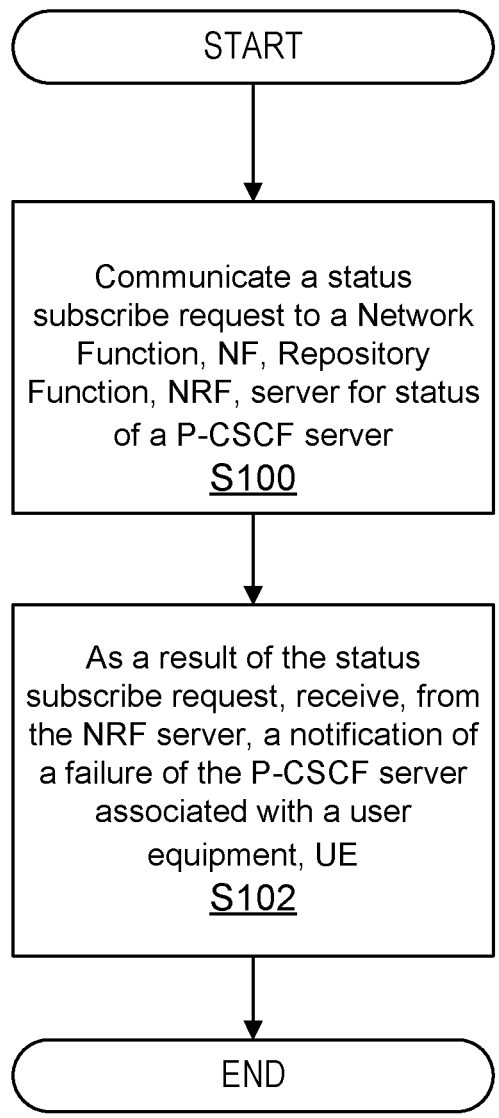
FIG. 2 is a flow diagram of an example of a restoration process of subscriber in accordance with at least some of the principles of the disclosure.

FIG. 2 is a flowchart of an exemplary process in S-CSCF 12 for P-CSCF restoration according to at least some of the principles of the disclosure. One or more Blocks and/or functions and/or methods performed by the S-CSCF 12 may be performed by one or more elements of S-CSCF 12 such as by Subscriber 30 and/or Maintainer 31 in processing circuitry 24, processor 28, communication interface 22, etc. according to the example method. The method may include communicating (Block S100), such as via Subscriber 30, processing circuitry 24, processor 28, communication interface 22, a status subscribe request to a Network Function, NF, Repository Function, NRF, server for status of a P-CSCF server. The method may include, as a result of the status subscribe request, receive (Block S102), such as via Subscriber 30, processing circuitry 24, processor 28, communication interface 22, from the NRF server, a notification of a failure of the P-CSCF server associated with a user equipment, UE 14. In some embodiments, the method further includes, as a result of at least the received notification, communicating, such as via Subscriber 30, processing circuitry 24, processor 28, communication interface 22, from the NRF server, an indication of the failure of the P-CSCF server associated with the UE 14 to a Home Subscriber Server, HSS, server 16.

In some embodiments, processing circuitry 24 (and/or Subscriber 30 and/or Maintainer 31) is configured receive (via e.g., communication interface 22), such as from a Network Function (NF) Repository Function (NRF), a notification of a failure of a P-CSCF associated with a user equipment (UE) 14. Processing circuitry 24 (and/or Subscriber 30 and/or Maintainer 31) is configured to, as a result of at least the received notification, communicate (via e.g., communication interface 22) an indication of the failure of the P-CSCF associated with the UE 14 to a Home Subscriber Server (HSS) 16. In some embodiments, the processing circuitry 24 is further configured to communicate (via, e.g., communication interface 22) a status subscribe request to the NRF for status of the P-CSCF. In some embodiments, the received notification of the failure of the P-CSCF associated with the UE 14 is in response to at least the status subscribe request.

Figure 3:
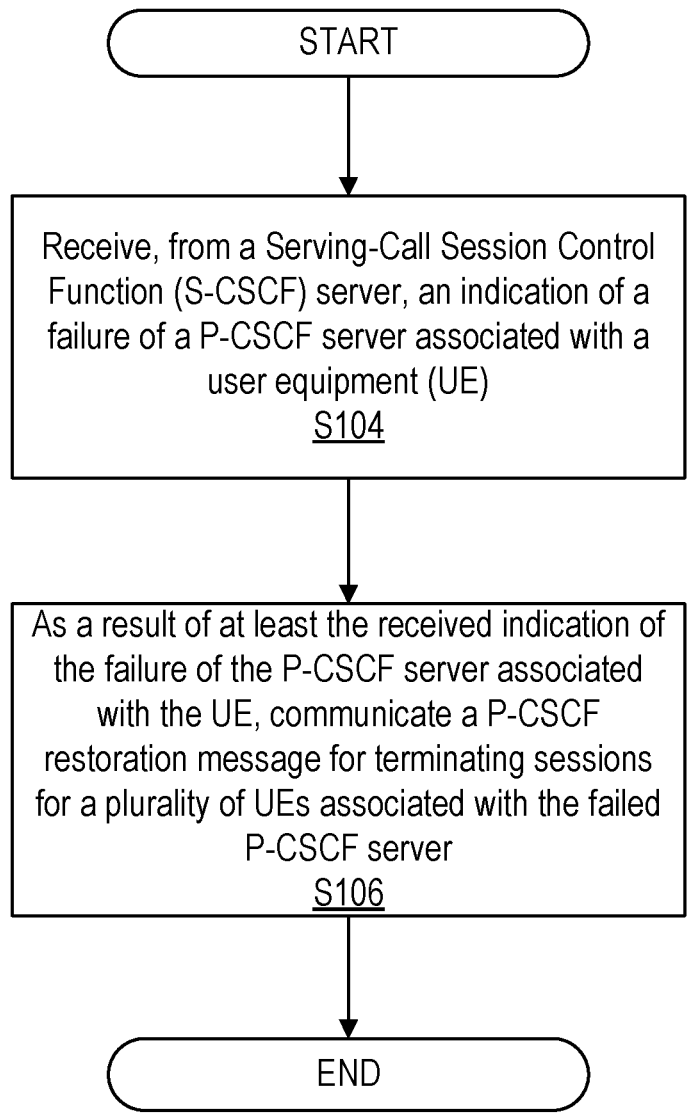
FIG. 3 is a flow diagram of an example of a restoration process of restorer in accordance with at least some of the principles of the disclosure.

FIG. 3 is a flowchart of an exemplary process in an HSS server 16 according to some embodiments of the present disclosure. One or more Blocks and/or functions and/or methods performed by the HSS server 16 may be performed by one or more elements of HSS server 16 such as by Restorer 50 in processing circuitry 44, processor 48, communication interface 42, etc. according to the example method. Processing circuitry 44 (and/or Restorer 50) is configured to receive (via e.g., communication interface 42), from a Serving-Call Session Control Function (S-CSCF) server 12, an indication of a failure of a P-CSCF server associated with a user equipment (UE) 14 (Block S104). Processing circuitry 44 (and/or Restorer 50) is configured to, as a result of at least the received indication of the failure of the P-CSCF server associated with the UE 14, communicate (via e.g., communication interface 42) a P-CSCF restoration message (e.g., to a policy server 18, SMF and/or AMF) for terminating sessions for a plurality of UEs 14 associated with the failed P-CSCF server (Block S106).

In some embodiments, the policy server 18 includes at least one of a Policy Control Function (PCF) and a Policy and Charging Rules Function (PCRF). In some embodiments, the plurality of UEs 14 associated with the failed P-CSCF server includes at least all other UEs 14 associated with the failed P-CSCF server (e.g., other than the UE 14 whose session termination resulted in the P-CSCF failure notification). In some embodiments, the P-CSCF restoration message includes an indication of the failed P-CSCF server. In some embodiments, the indication of the failed P-CSCF server includes at least an address of the P-CSCF server.

Figure 4:
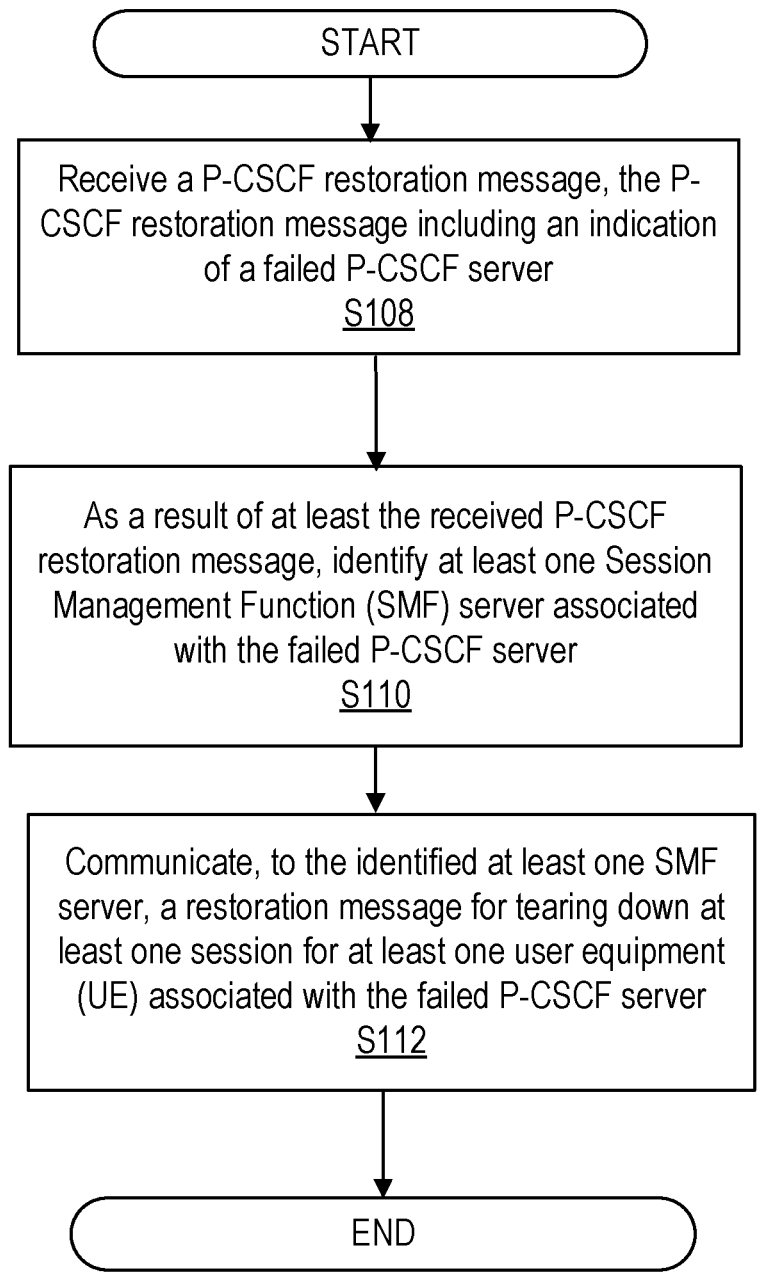
FIG. 4 is a flow diagram of an example of a restoration process of session terminator in accordance with at least some of the principles of the disclosure.

FIG. 4 is a flowchart of an exemplary process in a policy server 18 according to some embodiments of the present disclosure. One or more Blocks and/or functions and/or methods performed by the policy server 18 may be performed by one or more elements of policy server 18 such as by Session Terminator 60 in processing circuitry 54, processor 58, communication interface 52, etc. according to the example method. Processing circuitry 54 (and/or Session Terminator 60) is configured to receive (via e.g., communication interface 52) (e.g., from a Home Subscriber System (HSS) server 16) a P-CSCF restoration message, the P-CSCF restoration message including an indication of a failed P-CSCF server (Block S108). Processing circuitry 54 (and/or Session Terminator 60) is configured to, as a result of at least the received P-CSCF restoration message, identify at least one Session Management Function (SMF) server 20 associated with the failed P-CSCF server (Block S110).

Processing circuitry 54 (and/or Session Terminator 60) is configured to communicate (via e.g., communication interface 52), to the identified at least one SMF server 20, a restoration message for tearing down at least one session for at least one user equipment (UE) 14 associated with the failed P-CSCF server (Block S112).

In some embodiments, the indication of the failed P-CSCF server includes at least an address of the P-CSCF server. In some embodiments, the identification of the at least one SMF server comprises an identification of each SMF associated with the failed P-CSCF server and the communication of the restoration message comprises a communication of the restoration message to each SMF associated with the failed P-CSCF server to tear down each session for each UE associated with the failed P-CSCF server. In some embodiments, the communication of the restoration message for tearing down the at least one session for the at least one UE 14 associated with the failed P-CSCF server forces the at least one UE 14 to re-register in Internet Protocol Multimedia Subsystem (IMS) with a second P-CSCF server, the second P-CSCF server being different from the failed P-CSCF server. In some embodiments, the policy server 18 comprises at least one of a Policy Control Function (PCF) and a Policy and Charging Rules Function (PCRF).

Figure 5:
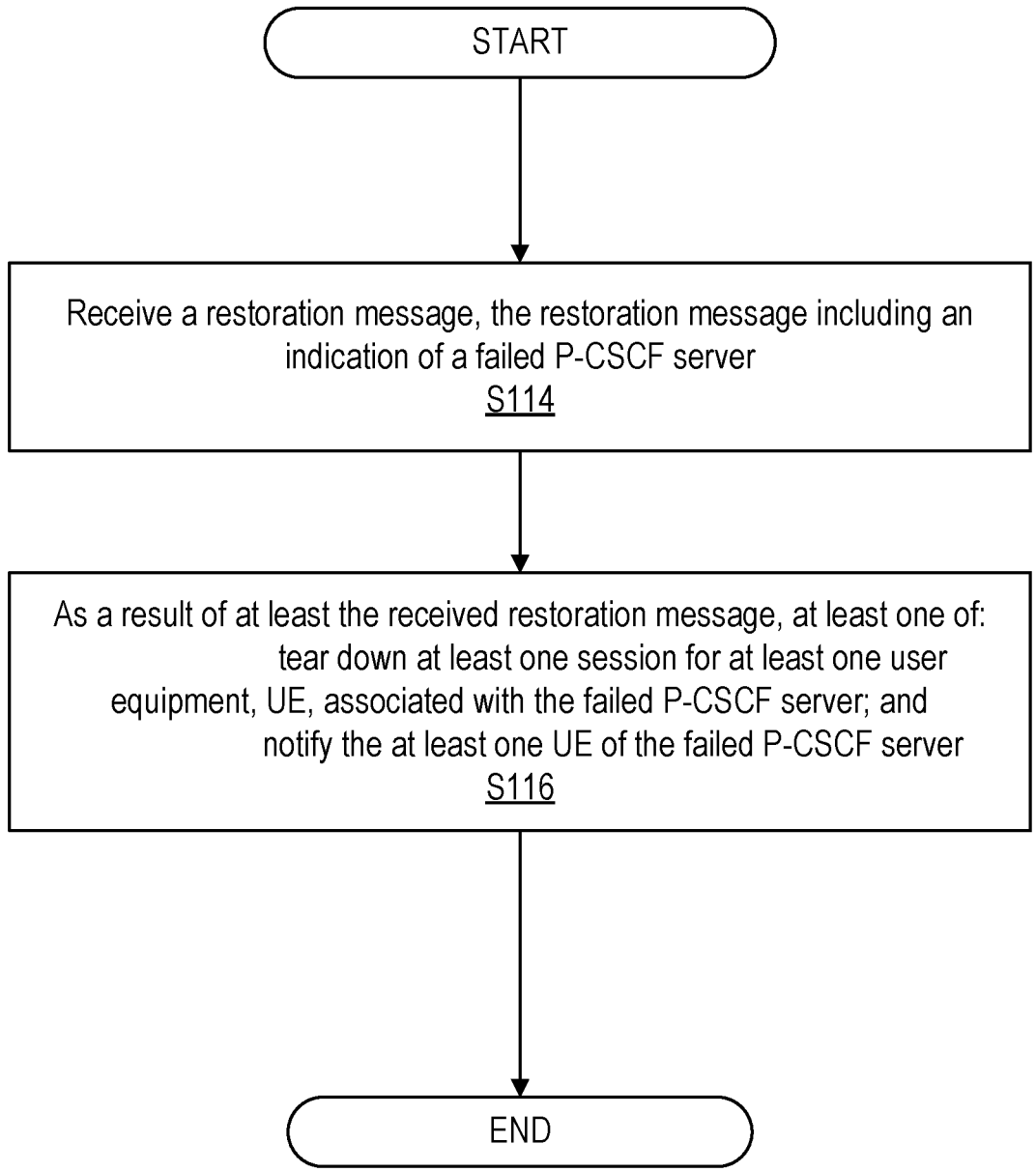
FIG. 5 is a flow diagram of an example of a restoration process of session manager in accordance with at least some of the principles of the disclosure.

FIG. 5 is a flowchart of an exemplary process in a SMF server 20 according to some embodiments of the present disclosure. One or more Blocks and/or functions and/or methods performed by the SMF server 20 may be performed by one or more elements of SMF server 20 such as by Session Manager 70 in processing circuitry 64, processor 68, communication interface 62, etc. according to the example method. Processing circuitry 64 (and/or Session Manager 70) is configured to receive (via e.g., communication interface 62 (e.g., from a policy server 18, HSS 16 or other node in the system 10) a restoration message, the restoration message including an indication of a failed P-CSCF server (Block S114). Processing Circuitry 64 (and/or Session Manager 70) is configured to, as a result of at least the received restoration message, at least one of: tear down at least one session for at least one user equipment (UE) 14 associated with the failed P-CSCF server; and notify the at least one UE 14 of the failed P-CSCF server (Block S116).

In some embodiments, the processing circuitry 64 is further configured to, communicate (via e.g., communication interface 62) an address of a second P-CSCF server for re-registration of the at least one UE 14, the second P-CSCF server being different from the failed P-CSCF server. In some embodiments, the tear down of the at least one session for the at least one UE 14 associated with the failed P-CSCF server comprises a tear down of each session for each UE 14 associated with the failed P-CSCF server. In some embodiments, the processing circuitry 64 is configured to, as a result of the received restoration message, locate each UE 14 participating in a Protocol Data Unit, PDU, session using the failed P-CSCF server.

Figure 6:
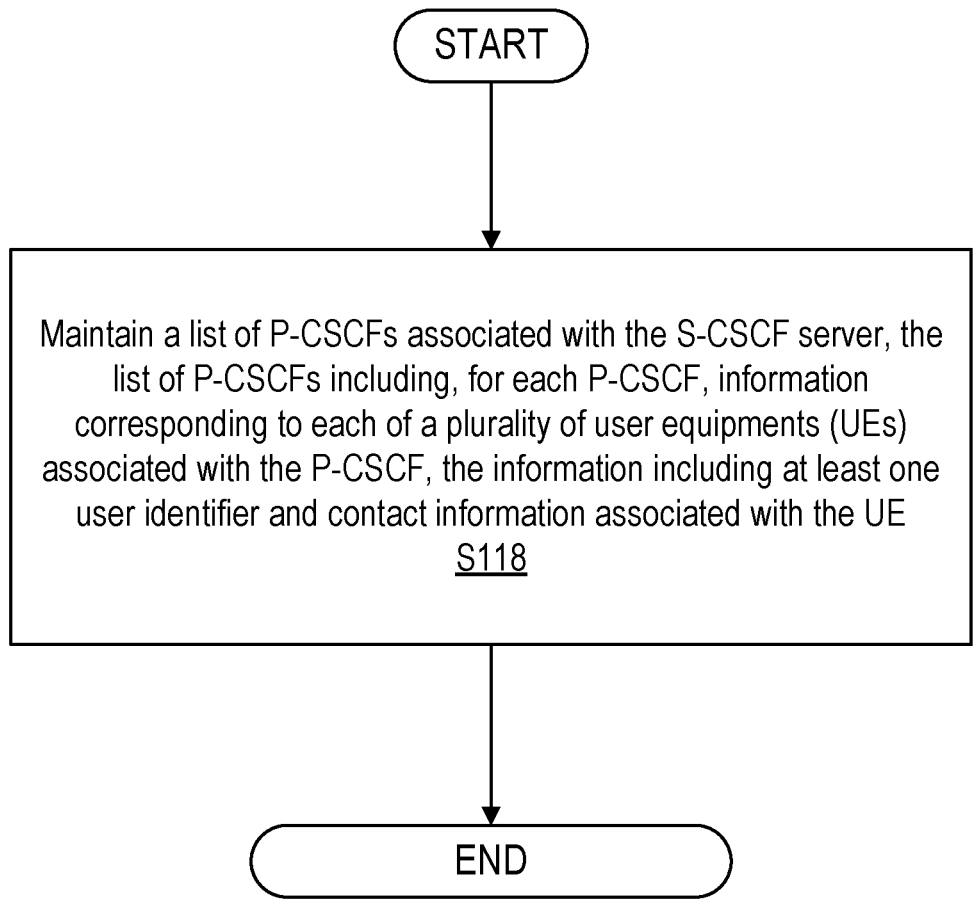
FIG. 6 is a flow diagram of an example of a restoration process of restorer in accordance with at least some of the principles of the disclosure.

FIG. 6 is a flowchart of an exemplary process in S-CSCF 12 for P-CSCF restoration according to at least some of the principles of the disclosure. One or more Blocks and/or functions and/or methods performed by the S-CSCF 12 may be performed by one or more elements of S-CSCF 12 such as by Subscriber 30 and/or Maintainer 31 in processing circuitry 24, processor 28, communication interface 22, etc. according to the example method. Processing circuitry 24 (Subscriber 30 and/or Maintainer 31) is configured to maintain a list of P-CSCFs associated with the S-CSCF server, the list of P-CSCFs including, for each P-CSCF, information corresponding to each of a plurality of user equipments (UEs) 14 associated with the P-CSCF, the information including at least one user identifier and contact information associated with the UE 14 (Block S118).

In some embodiments, the at least one user identifier includes an IMS private identity (IMPI)/IMS public identity (IMPU) pair and the contact information includes a contact address associated with the UE. In some embodiments, the processing circuitry 24 is further configured to cause a communication (e.g., via communication interface 22) of a status subscribe request for each P-CSCF in the list of P-CSCFs. In some embodiments, the processing circuitry 24 is further configured to cause the communication of the status subscribe request to a Network Function (NF) Repository Function (NRF). In some embodiments, the communication of the status subscribe request is responsive to an assignment of the UE 14 to the S-CSCF server 12 during a registration procedure of the UE 14 to Internet Protocol (IP) Multimedia Subsystem (IMS). In some embodiments, the communication of the status subscribe request is part of an administrative procedure of the S-CSCF server 12. In some embodiments, the processing circuitry 24 is further configured to receive (e.g., via communication interface 22) a notification of at least one P-CSCF in the list of P-CSCFs as a failed P-CSCF, as a result of the status subscribe request and a failure of the failed P-CSCF. In some embodiments, the received notification of the failed P-CSCF is a result of a detection of a terminating session of one of the plurality of UEs 14. In some embodiments, the processing circuitry 24 is further configured to, as a result of at least the received notification of the failed P-CSCF, cause at least one communication (e.g., via communication interface 22) of an indication of the failed P-CSCF to a Home Subscriber Server (HSS), for the plurality of UEs 14 associated with the failed P-CSCF. In some embodiments, the at least one communication of the indication of the failed P-CSCF includes a server assignment request (SAR) message for each of the plurality of UEs associated with the failed P-CSCF. In some embodiments, the received notification of the failed P-CSCF is from the NRF and is based on one of a failure alarm message from the first P-CSCF and a periodic polling of P-CSCFs to identify a failed P-CSCF.

Figure 7:
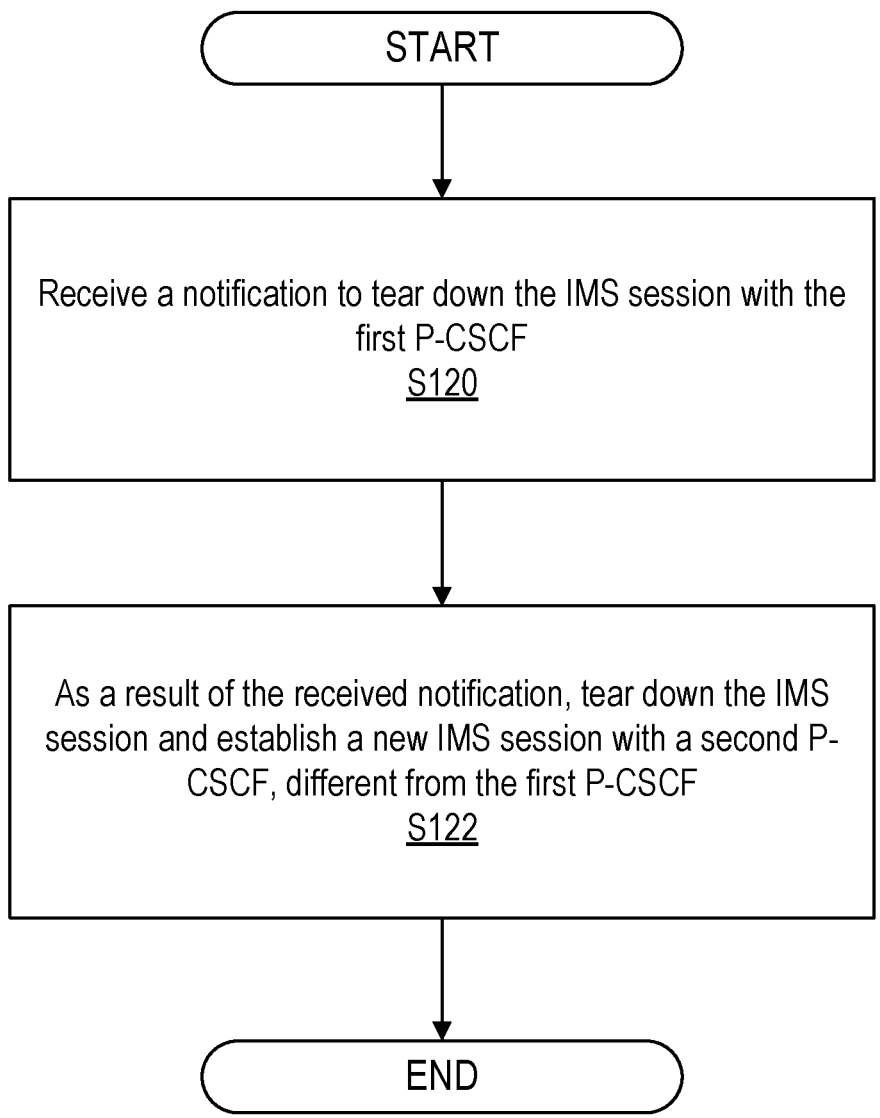
FIG. 7 is a flow diagram of an example of a session tear down process of session controller in accordance with at least some of the principles of the disclosure.

FIG. 7 is a flowchart of an exemplary process in a UE 14 according to some embodiments of the present disclosure. One or more Blocks and/or functions and/or methods performed by the UE 14 may be performed by one or more elements of UE 14 such as by Session Controller 40 in processing circuitry 34, processor 38, communication interface 32, etc. according to the example method. Processing circuitry 34 (and/or Session Controller 40) is configured to receive (e.g., from AMF, SMF 20 or other node in the system 10) a notification to tear down the IMS session with the first P-CSCF (Block S120). Processing circuitry 34 (and/or Session Controller 40) is configured to, as a result of the received notification, tear down the IMS session and establish a new IMS session with a second P-CSCF, different from the first P-CSCF (Block S122).

In some embodiments, the received notification to tear down the IMS session with the first P-CSCF is a result of a detected failure in the first P-CSCF. In some embodiments, the received notification to tear down the IMS session with the first P-CSCF is based on another UE 14 terminating an IMS session with the first P-CSCF, the another UE 14 being different from the UE 14. In some embodiments, the detected failure in the first P-CSCF is based on one of a failure alarm message from the first P-CSCF and a periodic polling of P-CSCFs to identify a failed P-CSCF.

Having described some embodiments of the present disclosure, a more detailed description of some of the embodiments will be described below, with reference to the call flow diagrams of FIGS. 8-12.

Figure 8:
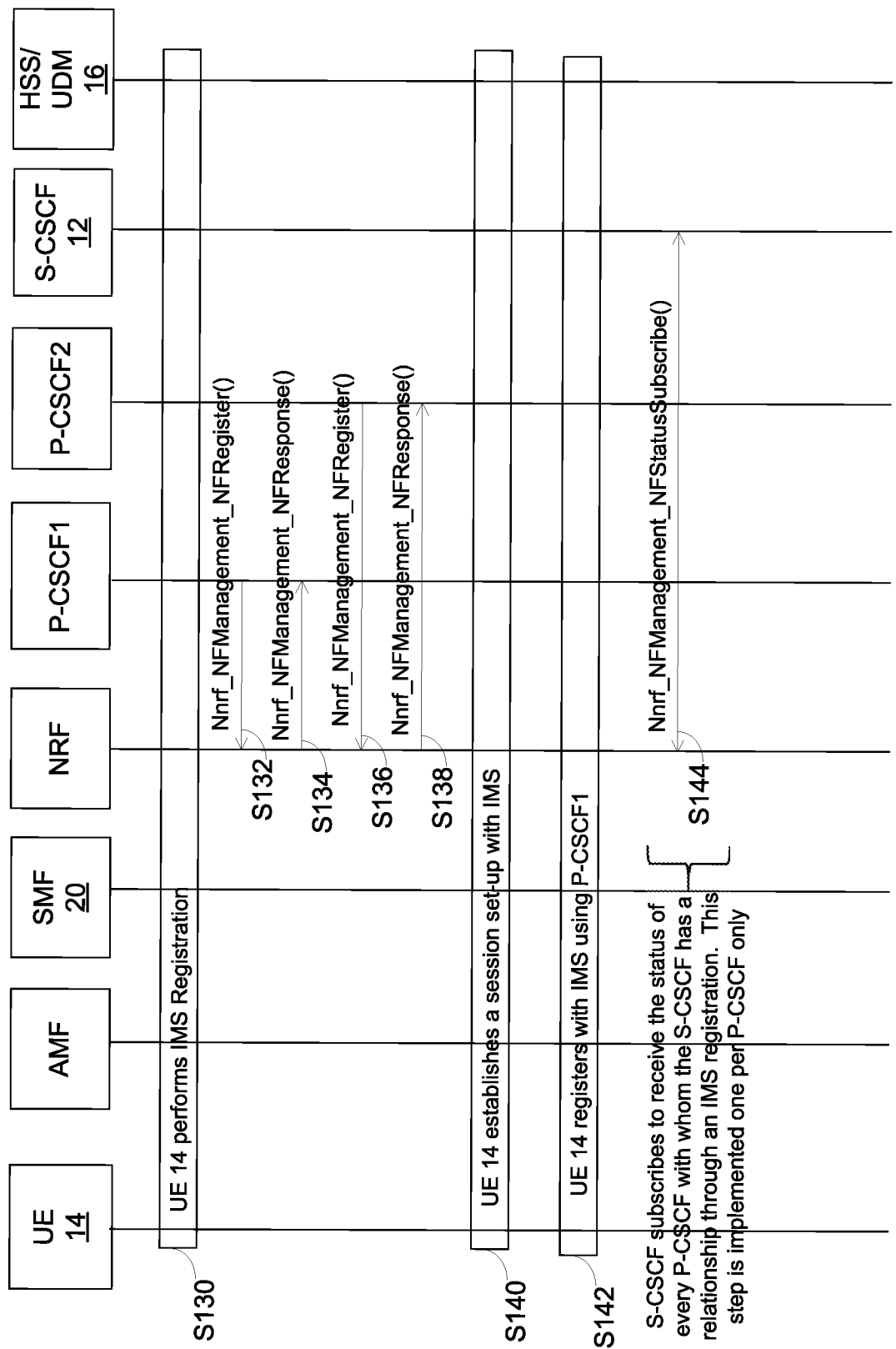
FIG. 8 is an exemplary call flow diagram according to some embodiments of the disclosure.

FIG. 8 is a call flow diagram showing an exemplary process according to some embodiments of the disclosure. FIG. 8 shows an example of a UE 14 registration, a P-CSCF registration with NRF, IMS registrations and the actions taken by the S-CSCF server 12, as described herein.

The following is a description of the exemplary steps in the call flow, according to some exemplary aspects:

In step S130, the UE 14 performs an access network (e.g., 5GS) registration and acquires an IP address.

In steps S132 and S134, P-CSCF1 registers with NRF.

In steps S136 and S138, P-CSCF2 registers with NRF.

In step S140, the UE 14 establishes a session with the IMS APN.

In step S142, the UE 14 performs IMS registration using P-CSCF1.

In step S144, the S-CSCF server 12 subscribes to NRF to receive status information of every P-CSCF with whom the S-CSCF server 12 is associated with. In some embodiments, the status subscription request may be sent to NRF once per new P-CSCF that the S-CSCF server 12 learns about through an IMS initial registration. Step S144 in this call flow is shown in FIG. 8 as being implemented in traffic, real-time. However, it can also be implemented through administrative procedures, such as, for example, when the S-CSCF server 12 is put in service by configuring the list of P-CSCFs in the S-CSCF server 12. In such embodiments, if the list of P-CSCFs changes the S-CSCF server 12 may update its status subscription accordingly.

Figure 9:
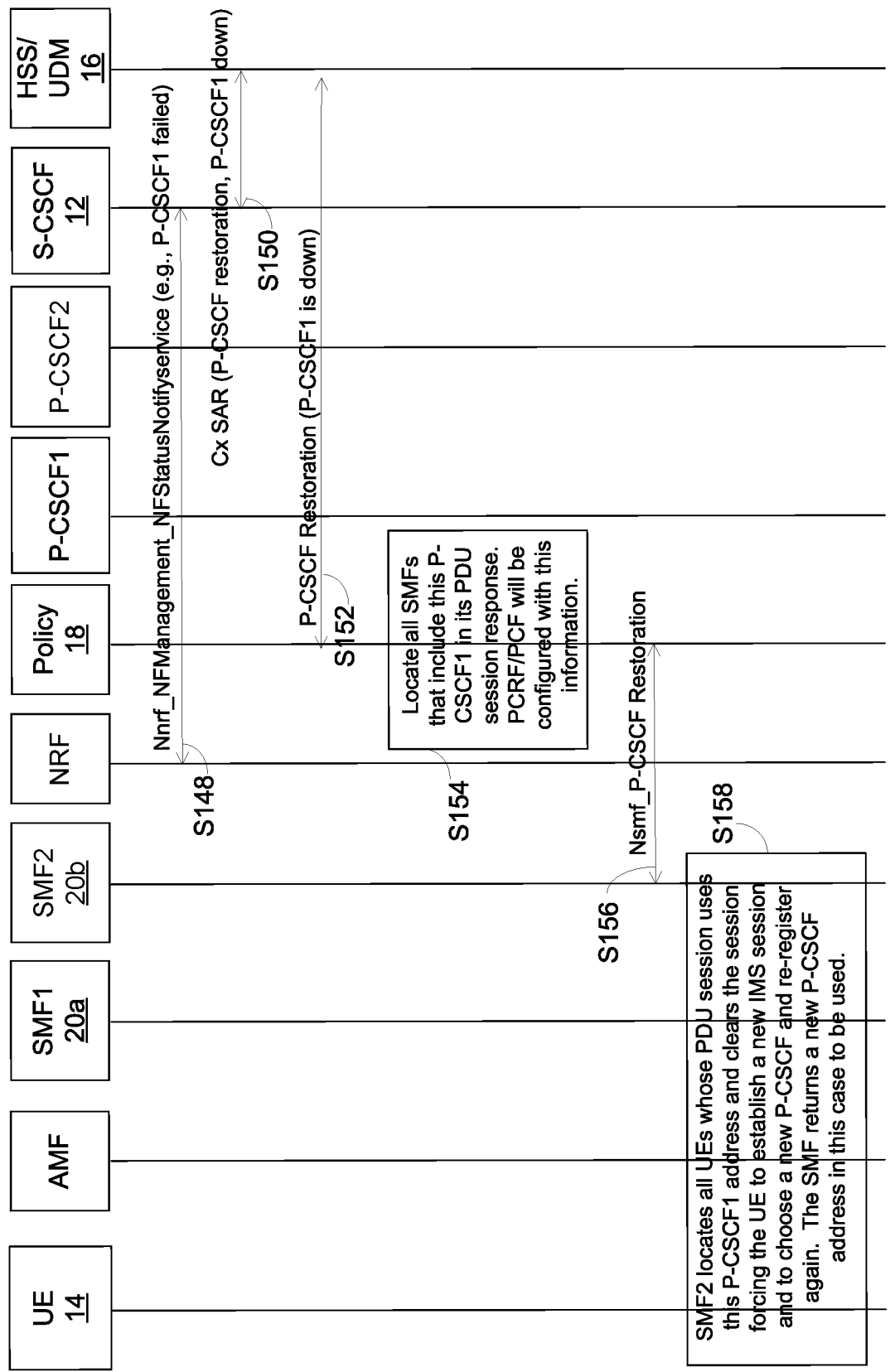
FIG. 9 is a continuation of the exemplary call flow diagram of FIG. 8, according to some embodiments of the disclosure.

FIG. 9 is a continuation of the call flow diagram of FIG. 8. FIG. 9 illustrates an example of the steps that may be performed as a result of a failure of a P-CSCF.

Figure 10:
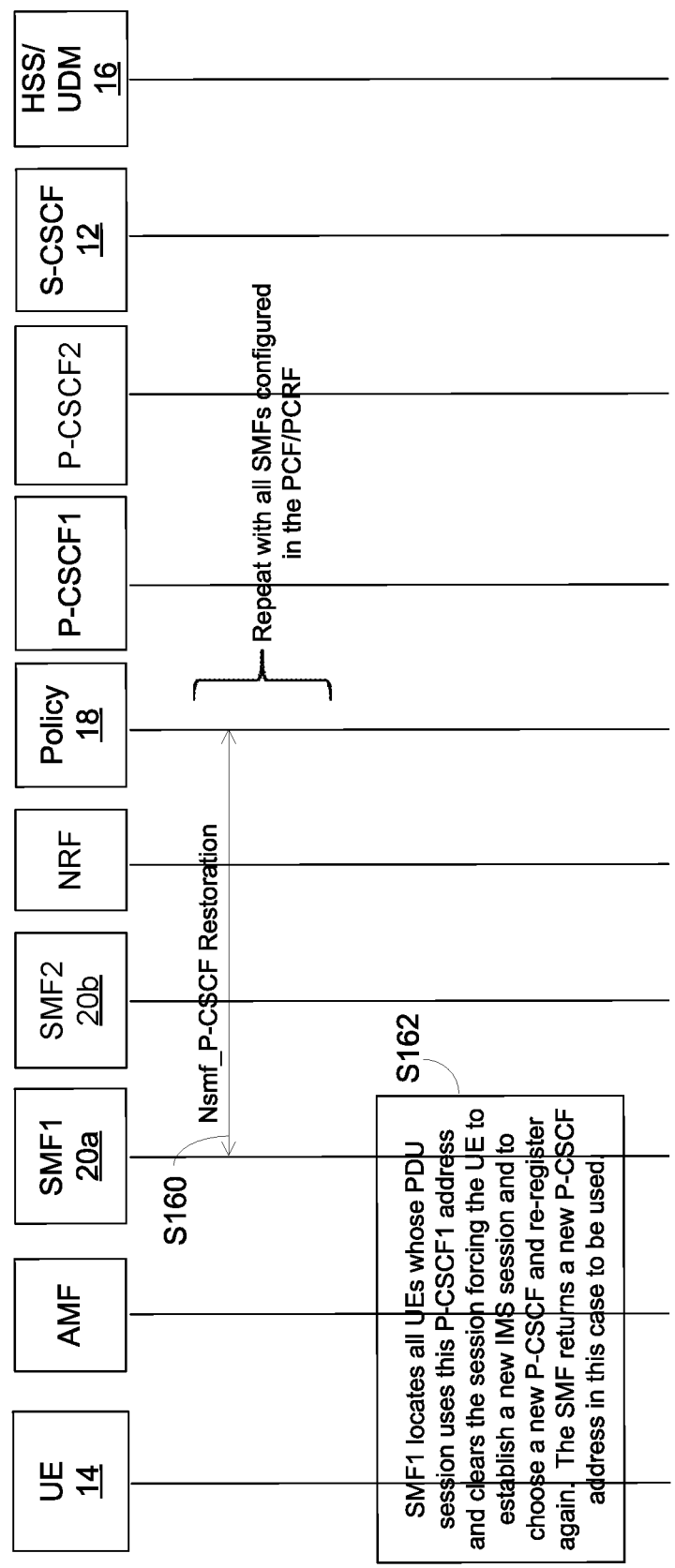
FIG. 10 is a continuation of the exemplary call flow diagram of FIG. 9, according to some embodiments of the disclosure.

In particular, in one embodiment, FIG. 9 illustrates an embodiment in which P-CSCF restoration involves a policy server 18, such as, for example a PCRF/PCF server 18. In such embodiment, when an S-CSCF server 12 is notified from the NRF of a failed P-CSCF (as shown for example in step S148 of FIG. 9), the S-CSCF server 12 may communicate with the HSS server 16 for the impacted IMPI/IMPU pair to report the failed P-CSCF, as shown for example in step S150 of FIG. 9). The HSS server 16 may, in response, communicate a new request to the policy server 18 (e.g., PCRF/PCF) associated with the UE 14 to invoke P-CSCF restoration, as shown for example in step S152 of FIG. 9. The policy server 18 (e.g., PCRF/PCF) may locate all SMFs 20 that have used this P-CSCF address, as shown for example in step S154 of FIG. 9. Such information may be configured in the policy server 18 (e.g., PCRF/PCF). For each SMF 20 in that list, the policy server 18 may invoke P-CSCF restoration, as shown for example in steps S156 of FIG. 9, as well as, step S160 of FIG. 10. Specifically, step S156 of FIG. 9 illustrates the policy server 18 invoking P-CSCF restoration for SMF2 20b and step S160 of FIG. 10 illustrates the policy server 18 invoking P-CSCF restoration for SMF1 20a. The SMF 20, in response to the policy server 18 invoking P-CSCF restoration, may locate all UEs 14 that are using the failed P-CSCF and, for each UE 14, may tear down the session forcing the UE 14 to reestablish a new Protocol Data Unit (PDU) session and where the SMF 20 returns the address of a new P-CSCF, as shown for example in step S158 of FIG. 9 and step S162 of FIG. 10. Stated another way, when the session is torn down, the UE 14 is forced to establish a new session with a new P-CSCF. The SMF 20 may return the address(es) of the P-CSCFs that the UE 14 can use to initiate IMS registration/re-registration. Step S158 may be repeated for each UE 14 as a result of step S156. Similarly, as shown in FIG. 10, step S162 may be repeated for each UE 14 as a result of step S160. Further, steps S160 and S162 may be repeated for each SMF 20 configured in the policy server 18. In other words, step S156 (and step S160 for SMF1 20*a*) may be repeated for every SMF 20 located by e.g., policy server 18 in e.g., step S154; and, each such located SMF 20 may repeat step S158 (and step S162 for SMF1 20*a*) for each UE 14 associated with the respective SMF 20.

Figure 11:
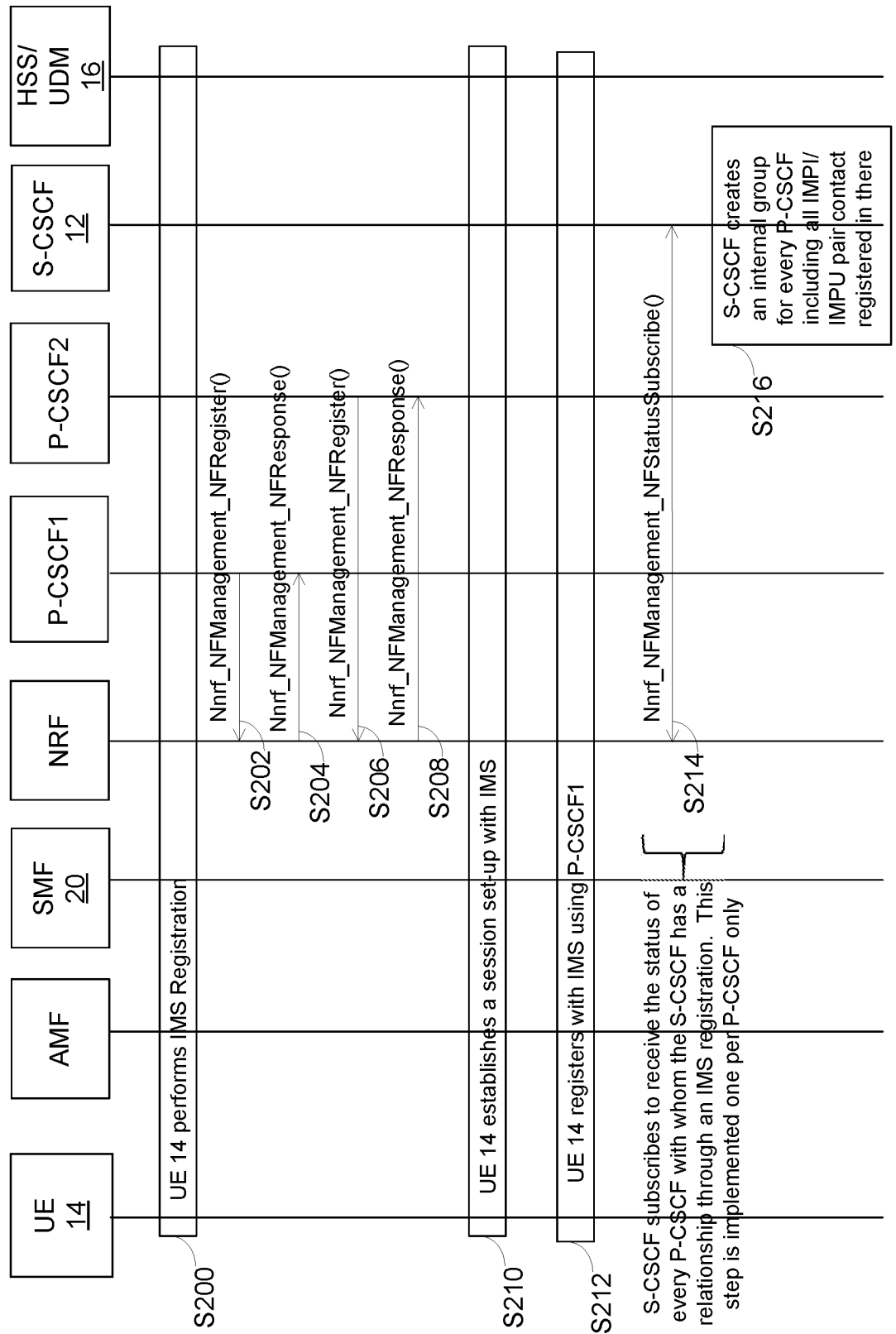
FIG. 11 is an exemplary call flow diagram according to some embodiments of the disclosure.

FIG. 11 is a call flow diagram showing an exemplary process according to some embodiments of the disclosure. FIG. 11 shows an example of a UE 14 registration, a P-CSCF registration with NRF, IMS registrations and the actions taken by the S-CSCF server 12, as described herein.

The following is a description of the exemplary steps in the call flow, according to some exemplary aspects:

In step S200, the UE 14 performs an access network (e.g., 5GS) registration and acquires an IP address.

In steps S202 and S204, P-CSCF1 registers with NRF.

In steps S206 and S208, P-CSCF2 registers with NRF.

In step S210, the UE 14 establishes a session with the IMS APN.

In step S212, the UE 14 performs IMS registration using P-CSCF1.

In step S214, the S-CSCF server 12 subscribes to NRF to receive status information of every P-CSCF with whom the S-CSCF server 12 is associated with. In some embodiments, the status subscription request may be sent to NRF once per new P-CSCF that the S-CSCF server 12 learns about through an IMS initial registration. Step S214 in this call flow is shown in FIG. 11 as being implemented in traffic, real-time. However, it can also be implemented through administrative procedures, such as, for example, when the S-CSCF server 12 is put in service by configuring the list of P-CSCFs in the S-CSCF server 12. In such embodiments, if the list of P-CSCFs changes the S-CSCF server 12 may update its status subscription accordingly.

In step S216, the S-CSCF server 12 may create and/or maintain an internal list of P-CSCFs associated with the S-CSCF server 12. In some embodiments, the list includes, for each P-CSCF in the list, information on all of the UEs 14 associated with the corresponding P-CSCF. In some embodiments, the information includes an IMPI/IMPU pair and contacts for each UE 14 per P-CSCF after a successful IMS registration. In some embodiments, by creating and/or maintaining an internal list of P-CSCFs, and for each P-CSCF, information for each UE 14 associated with the P-CSCF, the S-CSCF server 12 can, once notified of a failure of a P-CSCF in the list, initiate P-CSCF restoration procedures for all UEs 14 that are using that failed P-CSCF. Accordingly, embodiments of the disclosure can actively restore all the UEs 14 (or at least most of the UEs 14) associated with a failed P-CSCF, as a result of obtaining knowledge of such P-CSCF failure.

Figure 12:
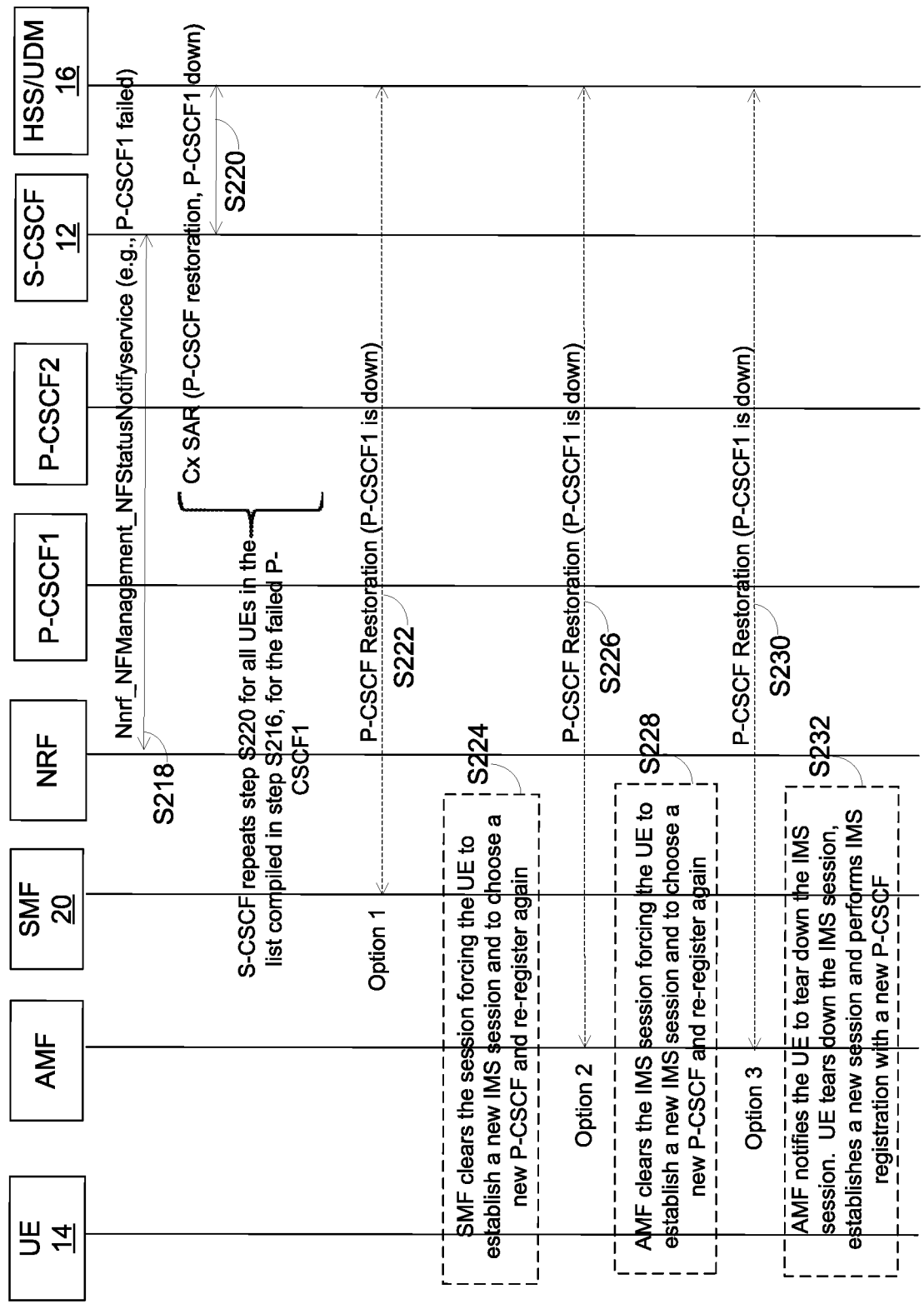
FIG. 12 is a continuation of the exemplary call flow diagram of FIG. 11, according to some embodiments of the disclosure.

FIG. 12 is a continuation of the call flow diagram of FIG. 11. FIG. 12 illustrates an example of the steps that may be performed as a result of a failure of a P-CSCF.

The following is a brief description of the exemplary steps in the call flow:

In step S218, the S-CSCF server 12 is notified by the NRF of a P-CSCF failure (in this example P-CSCF1 fails). In step S218, when the NRF sends a notification that P-CSCF1 failed, the message can be triggered for example in real-time (e.g., a detection in a failed terminating IMS session as an example), in some embodiments. In some embodiments, the term "real-time" may be used to indicate traffic-related failure detection as a result of real-time traffic (e.g., a failed terminating IMS session). In some embodiments, an operator Operations & Maintenance (O&M) node may be informed from HSS (e.g., operator own implementation) which can result in a notification to NRF via, for example, an implementation-dependent procedure to generate the failure indication message.

In some embodiments, the term "non-real-time" or "non-traffic-related" may be used to indicate a failure that is detected other than by real-time traffic conditions. For example, in some embodiments, the failure message may be triggered by, for example, an O&M node that polls P-CSCFs regularly or periodically, and when a P-CSCF does not respond, the O&M node may notify the NRF. In yet other embodiments, the P-CSCF failure notification may be triggered by the P-CSCF as a major alarm that is sent to an O&M node, which notifies the NRF. In some embodiments, there may be other triggers for the P-CSCF failure notification.

In step S220, the S-CSCF server 12 may go through its list of UEs 14 impacted by the failed P-CSCF, P-CSCF1 in this example case, and for every UE 14, (e.g., that has been recorded in step S216 of every IMS registration that is using P-CSCF1) the S-CSCF server 12 notifies HSS 16.

HSS 16 may then act accordingly to indicate P-CSCF restoration to each impacted UE 14. In one embodiment, HSS 16 notifies the SMF 20 associated with that UE 14 that P-CSCF restoration is required (option 1). In another embodiment, HSS 16 notifies the AMF associated with that UE 14 that P-CSCF restoration is required (option 2). In yet another embodiment, HSS 16 notifies the AMF and AMF prompts the UE 14 to tear down and establish a new session (option 3).

In step S222, optionally, the HSS 16 notifies SMF 20 of the P-CSCF failure and the SMF 20 (option 1) clears the IMS session for the UE 14 in step S224. The UE 14 is then forced to create a new IMS session with a new P-CSCF.

In step S226, optionally, the HSS 16 notifies AMF and AMF (option 2) clears the IMS session for the UE 14 in step S228. The UE 14 is then forced to create a new IMS session with a new P-CSCF.

In step S230, optionally, AMF (option 3) notifies that UE 14 requires P-CSCF restoration. In step S232, the UE 14 is notified to tear down the IMS session. The UE 14 then tears down the IMS session and establishes a new IMS session.

In some embodiments, step S220 is repeated for each UE 14 that is using the P-CSCF1 that failed. In some further embodiments, option 1, option 2, or option 3 (or some other embodiment) is repeated for each UE 14 that is using the P-CSCF that failed.

As used herein, the terms "maintain" and "maintaining" are intended broadly, and, in some embodiments may include storing the list of P-CSCFs (i.e., list of P-CSCF addresses or other P-CSCF identifying information) in for example memory 26 and/or updating the list as the S-CSCF server 12 becomes aware of, and/or loses its association with one or more of the P-CSCFs. As used herein, the term "list" is intended to be used in the broad sense, and, in some embodiments may be used to indicate a table, a record, a file, a database, or other arrangement of data (stored in for example non-transitory memory) that may be grouped in a predetermined manner, such as, for example, by grouping UEs 14 with the P-CSCF used by the UEs 14 and further including, identification and contact data (e.g., contact address) for each of such grouped UEs 14, or other systematic arrangements of data to be used according to at least some of the principles of the present disclosure. In some embodiments, the list may include one or more elements.

It should be understood that the call flow diagrams of FIGS. 8-12 illustrate exemplary implementations of proactive P-CSCF restoration procedures according to the principles of the present disclosure and is not intended to be limited to the implementation details described for FIGS. 8-12, unless otherwise clearly indicated herein.

Some additional embodiments may include one or more of the following:

Embodiment A1. A Serving-Call Session Control Function (S-CSCF) server for Proxy-Call Session Control Function (P-CSCF) restoration, the S-CSCF server comprising processing circuitry configured to cause the S-CSCF server to:
  receive, from a Network Function (NF) Repository Function (NRF), a notification of a failure of a P-CSCF associated with a user equipment (UE); and
  as a result of at least the received notification, communicate an indication of the failure of the P-CSCF associated with the UE to a Home Subscriber Server (HSS).

Embodiment A2. The S-CSCF server of Embodiment A1, wherein the processing circuitry is further configured to:
  communicate a status subscribe request to the NRF for status of the P-CSCF; and
  the received notification of the failure of the P-CSCF associated with the UE is in response to at least the status subscribe request.

Embodiment B1. A method for a Serving-Call Session Control Function (S-CSCF) server for Proxy-Call Session Control Function (P-CSCF) restoration, the method comprising:
  receiving, from a Network Function (NF) Repository Function (NRF) server, a notification of a failure of a P-CSCF server associated with a user equipment (UE); and
  as a result of at least the received notification, communicating an indication of the failure of the P-CSCF server associated with the UE to a Home Subscriber Server (HSS) server.

Embodiment B2. The method of Embodiment B1, further comprising:
  causing a communication of a status subscribe request to the NRF server for status of the P-CSCF server; and
  the received notification of the failure of the P-CSCF server associated with the UE is in response to at least the status subscribe request.

Embodiment C1. A Home Subscriber System (HSS) server for Proxy-Call Session Control Function (P-CSCF) restoration, the HSS server comprising processing circuitry configured to cause the HSS server to:
  receive, from a Serving-Call Session Control Function (S-CSCF) server, an indication of a failure of a P-CSCF server associated with a user equipment (UE); and
  as a result of at least the received indication of the failure of the P-CSCF server associated with the UE, communicate a P-CSCF restoration message to a policy server for terminating sessions for a plurality of UEs associated with the failed P-CSCF server.

Embodiment C2. The HSS server of Embodiment C1, wherein the policy server includes at least one of a Policy Control Function (PCF) and a Policy and Charging Rules Function (PCRF).

Embodiment C3. The HSS server of any one of Embodiments C1 and C2, wherein the plurality of UEs associated with the failed P-CSCF server includes at least all other UEs associated with the failed P-CSCF server.

Embodiment C4. The HSS server of any one of Embodiments C1-C3, wherein the P-CSCF restoration message includes an indication of the failed P-CSCF server.

Embodiment C5. The HSS server of Embodiment C4, wherein the indication of the failed P-CSCF server includes at least an address of the P-CSCF server.

Embodiment D1. A method for a Home Subscriber System (HSS) server for Proxy-Call Session Control Function (P-CSCF) restoration, the method comprising:
  receiving, from a Serving-Call Session Control Function (S-CSCF) server, an indication of a failure of a P-CSCF server associated with a user equipment (UE); and
  as a result of at least the received indication of the failure of the P-CSCF server associated with the UE, communicating a P-CSCF restoration message to a policy server for terminating sessions for a plurality of UEs associated with the failed P-CSCF server.

Embodiment D2. The method of Embodiment D1, wherein the policy server includes at least one of a Policy Control Function (PCF) and a Policy and Charging Rules Function (PCRF).

Embodiment D3. The method of any one of Embodiments D1 and D2, wherein the plurality of UEs associated with the failed P-CSCF server includes at least all other UEs associated with the failed P-CSCF server.

Embodiment D4. The method of any one of Embodiments D1-D3, wherein the P-CSCF restoration message includes an indication of the failed P-CSCF server.

Embodiment D5. The method of Embodiment D4, wherein the indication of the failed P-CSCF server includes at least an address of the P-CSCF server.

Embodiment E1. A policy server for Proxy-Call Session Control Function (P-CSCF) restoration, the policy server comprising processing circuitry configured to cause the policy server to:
  receive, from a Home Subscriber System (HSS) server, a P-CSCF restoration message, the P-CSCF restoration message including an indication of a failed P-CSCF server;
  as a result of at least the received P-CSCF restoration message, identify at least one Session Management Function (SMF) server associated with the failed P-CSCF server; and
  communicate, to the identified at least one SMF server, a restoration message for tearing down at least one session for at least one user equipment (UE) associated with the failed P-CSCF server.

Embodiment E2. The policy server of Embodiment E1, wherein the indication of the failed P-CSCF server includes at least an address of the P-CSCF server.

Embodiment E3. The policy server of any one of Embodiments E1 and E2, wherein the identification of the at least one SMF server comprises an identification of each SMF associated with the failed P-CSCF server and the communication of the restoration message comprises a communication of the restoration message to each SMF associated with the failed P-CSCF server to tear down each session for each UE associated with the failed P-CSCF server.

Embodiment E4. The policy server of any one of Embodiments E1-E3, wherein the communication of the restoration message for tearing down the at least one session for the at least one UE associated with the failed P-CSCF server forces the at least one UE to re-register in Internet Protocol Multimedia Subsystem (IMS) with a second P-CSCF server, the second P-CSCF server being different from the failed P-CSCF server.

Embodiment E5. The policy server of any one of Embodiments E1-E4, wherein the policy server includes at least one of a Policy Control Function (PCF) and a Policy and Charging Rules Function (PCRF).

Embodiment F1. A method for a policy server for Proxy-Call Session Control Function (P-CSCF) restoration, the method comprising:
  receiving, from a Home Subscriber System (HSS) server, a P-CSCF restoration message, the P-CSCF restoration message including an indication of a failed P-CSCF server;
  as a result of at least the received P-CSCF restoration message, identifying at least one Session Management Function (SMF) server associated with the failed P-CSCF server; and
  communicating, to the identified at least one SMF server, a restoration message for tearing down at least one session for at least one user equipment (UE) associated with the failed P-CSCF server.

Embodiment F2. The method of Embodiment F1, wherein the indication of the failed P-CSCF server includes at least an address of the P-CSCF server.

Embodiment F3. The method of any one of Embodiments F1 and F2, wherein the identification of the at least one SMF server comprises an identification of each SMF associated with the failed P-CSCF server and the communication of the restoration message comprises a communication of the restoration message to each SMF associated with the failed P-CSCF server to tear down each session for each UE associated with the failed P-CSCF server.

Embodiment F4. The method of any one of Embodiments F1-F3, wherein the communication of the restoration message for tearing down the at least one session for the at least one UE associated with the failed P-CSCF server forces the at least one UE to re-register in Internet Protocol Multimedia Subsystem (IMS) with a second P-CSCF server, the second P-CSCF server being different from the failed P-CSCF server.

Embodiment F5. The method of any one of Embodiments F1-F4, wherein the policy server includes at least one of a Policy Control Function (PCF) and a Policy and Charging Rules Function (PCRF).

Embodiment G1. A Session Management Function (SMF) server for Proxy-Call Session Control Function (P-CSCF) restoration, the SMF server comprising processing circuitry configured to cause the SMF server to:
  receive, from a policy server, a restoration message, the restoration message including an indication of a failed P-CSCF server; and
  as a result of at least the received restoration message, tear down at least one session for at least one user equipment (UE) associated with the failed P-CSCF server.

Embodiment G2. The SMF server of Embodiment G1, wherein the processing circuitry is further configured to communicate an address of a second P-CSCF server for re-registration of the at least one UE, the second P-CSCF server being different from the failed P-CSCF server.

Embodiment G3. The SMF server of any one of Embodiments G1-G2, wherein the
tear down of the at least one session for the at least one UE associated with the failed P-CSCF server comprises a tear down of each session for each UE associated with the failed P-CSCF server.

Embodiment H1. A method for a Session Management Function (SMF) server for Proxy-Call Session Control Function (P-CSCF) restoration, the method comprising:
  receiving, from a policy server, a restoration message, the restoration message including an indication of a failed P-CSCF server; and
  as a result of at least the received restoration message, tearing down at least one session for at least one user equipment (UE) associated with the failed P-CSCF server.

Embodiment H2. The method of Embodiment H1, further comprising:
  communicating an address of a second P-CSCF server for re-registration of the at least one UE, the second P-CSCF server being different from the failed P-CSCF server Embodiment H3. The method of any one of Embodiments H1-H2, wherein the tearing down of the at least one session for the at least one UE associated with the failed P-CSCF server comprises tearing down of each session for each UE associated with the failed P-CSCF server.

Embodiment AA1. A Serving-Call Session Control Function (S-CSCF) server for Proxy-Call Session Control Function (P-CSCF) restoration, the S-CSCF server comprising processing circuitry having a processor and a memory, the memory containing instructions executable by the processor to configure the S-CSCF server to:
  maintain a list of P-CSCFs associated with the S-CSCF server, the list of P-CSCFs including, for each P-CSCF, information corresponding to each of a plurality of user equipments (UEs) associated with the P-CSCF, the information including at least one user identifier and contact information associated with the UE.

Embodiment AA2. The S-CSCF server of Embodiment AA1, wherein the at least one user identifier includes an IMS private identity (IMPI)/IMS public identity (IMPU) pair and the contact information includes a contact address associated with the UE.

Embodiment AA3. The S-CSCF server of any one of Embodiments AA1 and AA2, wherein the processing circuitry is further configured to cause a communication of a status subscribe request for each P-CSSF in the list of P-CSCFs.

Embodiment AA4. The S-CSCF server of Embodiment AA3, wherein the processing circuitry is further configured to cause the communication of the status subscribe request to a Network Function (NF) Repository Function (NRF).

Embodiment AA5. The S-CSCF server of any one of Embodiments AA3 and AA4, wherein the communication of the status subscribe request is responsive to an assignment of the UE to the S-CSCF server during a registration procedure of the UE to Internet Protocol (IP) Multimedia Subsystem (IMS).

Embodiment AA6. The S-CSCF server of any one of Embodiments AA3 and AA4, wherein the communication of the status subscribe request is part of an administrative procedure of the S-CSCF server.

Embodiment AA7. The S-CSCF server of any one of Embodiments AA1-AA6, wherein the processing circuitry is further configured to receive a notification of at least one P-CSCF in the list of P-CSCFs as a failed P-CSCF, as a result of the status subscribe request and a failure of the failed P-CSCF.

Embodiment AA8. The S-CSCF server of Embodiment AA7, wherein the received notification of the failed P-CSCF is a result of a detection of a terminating session of one of the plurality of UEs.

Embodiment AA9. The S-CSCF server of any one of Embodiments AA7 and A8, wherein the processing circuitry is further configured to, as a result of at least the received notification of the failed P-CSCF, cause at least one communication of an indication of the failed P-CSCF to a Home Subscriber Server (HSS), for the plurality of UEs associated with the failed P-CSCF.

Embodiment AA10. The S-CSCF server of Embodiment AA9, wherein the at least one communication of the indication of the failed P-CSCF includes a server assignment request (SAR) message for each of the plurality of UEs associated with the failed P-CSCF.

Embodiment AA11. The S-CSCF server of Embodiment AA7, wherein the received notification of the failed P-CSCF is from the NRF and is based on one of a failure alarm message from the first P-CSCF and a periodic polling of P-CSCFs to identify a failed P-CSCF.

Embodiment BB1. A method for a Serving-Call Session Control Function (S-CSCF) server for Proxy-Call Session Control Function (P-CSCF) restoration, the method comprising:
maintaining a list of P-CSCFs associated with the S-CSCF server, the list of P-CSCFs including, for each P-CSCF, information corresponding to each of a plurality of user equipments (UEs) associated with the P-CSCF, the information including at least one user identifier and contact information associated with the UE.

Embodiment BB2. The method of Embodiment BB1, wherein the at least one user identifier includes an IMS private identity (IMPI)/IMS public identity (IMPU) pair and the contact information includes a contact address associated with the UE.

Embodiment BB3. The method of any one of Embodiments BB1 and BB2, further comprising causing a communication of a status subscribe request for each P-CSSF in the list of P-CSCFs.

Embodiment BB4. The method of Embodiment BB3, wherein causing the communication further comprises causing the communication of the status subscribe request to a Network Function (NF) Repository Function (NRF).

Embodiment BB5. The method of any one of Embodiments BB3 and BB4, wherein the communication of the status subscribe request is responsive to an assignment of the UE to the S-CSCF server during a registration procedure of the UE to Internet Protocol (IP) Multimedia Subsystem (IMS).

Embodiment BB6. The method of any one of Embodiments BB3 and BB4, wherein the communication of the status subscribe request is part of an administrative procedure of the S-CSCF server.

Embodiment BB7. The method of any one of Embodiments BB1-BB6, further comprising receiving a notification of at least one P-CSCF in the list of P-CSCFs as a failed P-CSCF, as a result of the status subscribe request and a failure of the failed P-CSCF.

Embodiment BB8. The method of Embodiment BB7, wherein the received notification of the failed P-CSCF is a result of a detection of a terminating session of one of the plurality of UEs.

Embodiment BB9. The method of any one of Embodiments BB7 and BB8, further comprising, as a result of at least the received notification of the failed P-CSCF, causing at least one communication of an indication of the failed P-CSCF to a Home Subscriber Server (HSS), for the plurality of UEs associated with the failed P-CSCF.

Embodiment BB10. The method of Embodiment BB9, wherein the at least one communication of the indication of the failed P-CSCF includes a server assignment request (SAR) message for each of the plurality of UEs associated with the failed P-CSCF.

Embodiment BB11. The method of Embodiment BB7, wherein the received notification of the failed P-CSCF is from the NRF and is based on one of a failure alarm message from the first P-CSCF and a periodic polling of P-CSCFs to identify a failed P-CSCF.

Embodiment CC1. A user equipment (UE) for participating in an Internet Protocol (IP) Multimedia Subsystem (IMS) session using a first Proxy-Call Session Control Function (P-CSCF), the UE comprising processing circuitry having a processor and a memory, the processing circuitry configured to cause the UE to:
receive, from an Access and Mobility Function (AMF), a notification to tear down the IMS session with the first P-CSCF; and
as a result of the received notification, tear down the IMS session and establish a new IMS session with a second P-CSCF, different from the first P-CSCF.

Embodiment CC2. The UE of Embodiment CC1, wherein the received notification to tear down the IMS session with the first P-CSCF is a result of a detected failure in the first P-CSCF.

Embodiment CC3. The UE of any one of Embodiments CC1 and CC2, wherein the received notification to tear down the IMS session with the first P-CSCF is based on another UE terminating an IMS session with the first P-CSCF, the other UE being different from the UE.

Embodiment CC4. The UE of Embodiment CC2, wherein the detected failure in the first P-CSCF is based on one of a failure alarm message from the first P-CSCF and a periodic polling of P-CSCFs to identify a failed P-CSCF.

Embodiment DD1. A method for a user equipment (UE) for participating in an Internet Protocol (IP) Multimedia Subsystem (IMS) session using a first Proxy-Call Session Control Function (P-CSCF), the method comprising:
receiving, from an Access and Mobility Function (AMF), a notification to tear down the IMS session with the first P-CSCF; and
as a result of the received notification, tearing down the IMS session and establishing a new IMS session with a second P-CSCF, different from the first P-CSCF.

Embodiment DD2. The UE of Embodiment DD1, wherein the received notification to tear down the IMS session with the first P-CSCF is a result of a detected failure in the first P-CSCF.

Embodiment DD3. The UE of any one of Embodiments DD1 and DD2, wherein the received notification to tear down the IMS session with the first P-CSCF is based on another UE terminating an IMS session with the first P-CSCF, the other UE being different from the UE.

Embodiment DD4. The UE of Embodiment DD2, wherein the detected failure in the first P-CSCF is based on one of a failure alarm message from the first P-CSCF and a periodic polling of P-CSCFs to identify a failed P-CSCF.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a Serving-Call Session Control Function (S-CSCF) server for Proxy-Call Session Control Function (P-CSCF) restoration, the method comprising:
   communicating a status subscribe request to a Network Function (NF) Repository Function (NRF) server for status of a P-CSCF server, wherein every P-CSCF of a plurality of P-CSCF is registered with the NRF, and every S-CSCF of a plurality of S-CSCF subscribes with the NRF to the status of each of P-CSCF handled by the corresponding S-CSCF;
   as a result of the status subscribe request, receiving, from the NRF server, a notification of a failure of the P-CSCF server associated with a user equipment (UE), wherein the received notification of the failure of the P-CSCF server is based on one of a failure alarm message from the failed P-CSCF server or a periodic polling of a plurality of P-CSCF servers, and wherein the plurality of P-CSCF servers includes the P-CSCF server,
   wherein the S-CSCF contacts a Home Subscriber Server (HSS) for every Internet Protocol Multimedia Subsystem (IMS) private identity (IMPI)/IMS public identity (IMPU) pair in that list for the failed P-CSCF, and wherein each of the plurality of S-CSCF stores: a list of IMPU/IMPU pairs per P-CSCF with which the corresponding S-CSCF is associated, and contacts of the list of IMPU/IMPU pairs that are registered with the P-CSCF server;
   based on a message from the HSS, the S-CSCF communicating with the HSS for each of the IMPI/IMPU pair of the list of IMPU/IMPU pairs corresponding to the failed P-CSCF server; and
   clearing a current session and forcing the UE to re-register in a new IMS with another P-CSCF server different from the failed P-CSCF server, wherein a message is sent by the HSS to one of a corresponding Session Management (SMF) server or a corresponding Access and Mobility Function (AMF) server associated with each of the IMPI/IMPU pair, and wherein based on the message from the HSS, the SMF or the AMF clears the session forcing the UE to create a new IMS session.

2. The method of claim 1, further comprising:
as a result of at least the received notification, communicating an indication of the failure of the P-CSCF server associated with the UE to the HSS.

3. A policy server for Proxy-Call Session Control Function (P-CSCF) restoration, the policy server comprising processing circuitry configured to cause the policy server to:
receive a P-CSCF restoration message, the P-CSCF restoration message including an indication of a failed P-CSCF server, wherein the indication of the failure of the P-CSCF server is based on one of a failure alarm message from the failed P-CSCF server or a periodic polling of a plurality of P-CSCF servers, and wherein the plurality of P-CSCF servers includes the P-CSCF server, wherein every P-CSCF of a plurality of P-CSCF is registered with Network Function Repository Function (NRF), and every serving-CSCF (S-CSCF) of a plurality of S-CSCF subscribes with the NRF to the status of each of P-CSCF handled by the corresponding S-CSCF;
as a result of the received P-CSCF restoration message, identify at least one corresponding Session Management Function (SMF) server or a corresponding Access and Mobility Function (AMF) server associated with each of IMPI/IMPU pair corresponding to the failed P-CSCF server;
based on a message from a Home Subscriber Server (HSS), the S-CSCF communicates with the HSS for each of the IMPI/IMPU pair of the list of IMPU/IMPU pairs corresponding to the failed P-CSCF server, and wherein each of the plurality of S-CSCF stores: a list of IMPU/IMPU pairs per P-CSCF with which the corresponding S-CSCF is associated, and contacts of the list of IMPU/IMPU pairs that are registered with the P-CSCF server; and
communicate, to each of the identified at least one SMF server or to each of the AMF server, a restoration message for tearing down at least one session for at least one user equipment (UE) associated with the failed P-CSCF server, wherein based on the restoration message, the SMF or the AMF clears a current session and force the at least one UE to re-register in a new IMS with another P-CSCF server different from the failed P-CSCF server.

4. The policy server of claim 3, wherein the indication of the failed P-CSCF server includes at least an address of the P-CSCF server.

5. The policy server of claim 3, wherein the processing circuitry is further configured to cause the policy server to:
identify the at least one SMF server by being configured to cause the policy server to identify each SMF associated with the failed P-CSCF server; and
communicate the restoration message by being configured to cause the policy server to communicate a restoration message to each SMF associated with the failed P-CSCF server to tear down each session for each UE associated with the failed P-CSCF server.

6. The policy server of claim 3, wherein the processing circuitry is further configured to cause the policy server to:
locate each SMF that includes an indication of the P-CSCF server in a Protocol Data Unit (PDU) session response.

7. A Session Management Function (SMF) server for Proxy-Call Session Control Function (P-CSCF) restoration, the SMF server comprising processing circuitry configured to cause the SMF server to:
receive a restoration message from a Home Subscriber Server (HSS), the restoration message including an indication of a failed P-CSCF server, wherein the indication of the failure of the P-CSCF is based on one of a failure alarm message from the failed P-CSCF server or a periodic polling of a plurality of P-CSCF servers, wherein the plurality of P-CSCF servers includes the P-CSCF server, wherein every P-CSCF of the plurality of P-CSCF is registered with the NRF, and every serving-CSCF (S-CSCF) of a plurality of S-CSCF subscribes with the NRF to the status of each of P-CSCF handled by the corresponding S-CSCF, wherein each of the plurality of S-CSCF stores: a list of IMPU/IMPU pairs per P-CSCF with which the corresponding S-CSCF is associated, and contacts of the list of IMPU/IMPU pairs that are registered with the P-CSCF server, and wherein the S-CSCF communicates with the HSS for each of the IMPI/IMPU pair of the list of IMPU/IMPU pairs corresponding to the failed P-CSCF server; and
as a result of the received restoration message, at least one of:
tear down at least one session for at least one user equipment (UE) associated with the failed P-CSCF server;
notify the at least one UE of the failed P-CSCF server;
based on a message from the HSS, the S-CSCF communicating with the HSS for each of the IMPI/IMPU pair of the list of IMPU/IMPU pairs corresponding to the failed P-CSCF server; and
clear a current session and force the at least one UE to re-register in a new IMS with another P-CSCF server different from the failed P-CSCF server.

8. The SMF server of claim 7, wherein the processing circuitry is further configured to cause the SMF server to:
communicate an address of the another P-CSCF server for re-registration of the at least one UE.

9. The SMF server of claim 7, wherein the processing circuitry is further configured to cause the SMF server to tear down the at least one session for the at least one UE associated with the failed P-CSCF server by being configured to cause the SMF server to:
tear down each session for each UE associated with the failed P-CSCF server.

10. The SMF server of claim 7, wherein the processing circuitry is further configured to cause the SMF server to:
as a result of the received restoration message, locate each UE participating in a Protocol Data Unit (PDU) session using the failed P-CSCF server.

* * * * *